(12) United States Patent
Jia et al.

(10) Patent No.: US 10,839,394 B2
(45) Date of Patent: Nov. 17, 2020

(54) MACHINE LEARNING SYSTEM FOR TAKING CONTROL ACTIONS

(71) Applicant: Microsoft Technology Licensing, LLC, Redmond, WA (US)

(72) Inventors: Yuting Jia, Redmond, WA (US); Anand Ravindra Oka, Bellevue, WA (US); Liang-Yu Chen, Bothell, WA (US); Yiqing Wang, Bellevue, WA (US); Jayaram Naga Mrutyum Nanduri, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 27 days.

(21) Appl. No.: 16/172,477

(22) Filed: Oct. 26, 2018

(65) Prior Publication Data
US 2020/0134628 A1   Apr. 30, 2020

(51) Int. Cl.
*G06Q 20/40*    (2012.01)
*G06N 20/00*    (2019.01)
*G06N 5/04*     (2006.01)

(52) U.S. Cl.
CPC ........... *G06Q 20/4016* (2013.01); *G06N 5/04* (2013.01); *G06N 20/00* (2019.01)

(58) Field of Classification Search
CPC ....... G06Q 20/4016; G06N 20/00; G06N 5/04
See application file for complete search history.

(56) References Cited

U.S. PATENT DOCUMENTS

| 6,081,796 A | * | 6/2000 | Takagi | G01J 3/46 706/1 |
|---|---|---|---|---|
| 2007/0087756 A1 | * | 4/2007 | Hoffberg | G06Q 20/22 455/450 |
| 2013/0297492 A1 | * | 11/2013 | Ertresvaag | G06Q 20/389 705/39 |
| 2015/0073929 A1 | * | 3/2015 | Psota | G06Q 50/28 705/26.2 |
| 2015/0269609 A1 | * | 9/2015 | Mehanian | G06Q 30/0246 705/14.45 |
| 2016/0217513 A1 | * | 7/2016 | Moghaddam | G06Q 30/0609 |
| 2017/0039567 A1 | * | 2/2017 | Stern | G06Q 20/409 |

(Continued)

OTHER PUBLICATIONS

"International Search Report and Written Opinion Issued in PCT Application No. PCT/US2019/056291", dated Jan. 8, 2020, 24 Pages.

*Primary Examiner* — Scott C Anderson
(74) *Attorney, Agent, or Firm* — Arent Fox LLP

(57) ABSTRACT

A device in a data processing system for training machine learning models receives a transaction and forwards it to at least one of a plurality of integrated control action models that use outputs of one model as inputs to other models. The models are machine learning models jointly trained for taking each control action of a plurality of control actions on the transaction to maximize an objective function based on probabilities of the control actions matching corresponding target control actions. The machine learning models include a risk model that outputs risk prediction information for a first control action that indicates whether or not to initiate processing of the transaction. The device further receives the risk prediction information from the risk model, and executes at least the first control action based on the risk prediction information.

20 Claims, 11 Drawing Sheets

(56) References Cited

U.S. PATENT DOCUMENTS

2017/0200164 A1    7/2017  Choi et al.
2017/0270544 A1*   9/2017  Jaidka ................ G06Q 30/0202
2018/0040064 A1*   2/2018  Grigg ........................ G06N 5/04

* cited by examiner

MACHINE LEARNING SYSTEM FOR TAKING CONTROL ACTIONS

BACKGROUND

The present disclosure relates generally to machine learning-based control systems, and more particularly, to an integrated machine learning system for providing control actions.

Machine learning-based systems may be used in various technological systems, however, they are often independently implemented. For example, systems that operate based on control actions at various stages may implement a machine learning model at each stage. One type of such a technical system may be, but is not limited to, a payment/transaction processing system. Generally, in the chain of events that happen during a purchase authentication/authorization and the corresponding back office flow, there may be several "control actions" taken by the system for evaluating whether to process and/or for processing a purchase transaction. Taking overly restrictive control actions or loosening restrictions may result in inefficient system operation and/or may allow some fraudulent transactions.

Generally, a transaction processing system may receive and process a very large number of transactions, e.g., thousands or millions of transactions per hour, per day, etc. If a machine learning-based infrastructure that supports taking control action on such transactions does not operate efficiently, large amounts of computing resources such as communication and processing resources will be needed to support the transaction processing system, and it may not even be possible to provide timely responses in case of resource scarcity. For example, if the transaction processing system takes sub-optimal control actions that result in rejection or other adverse decisions on legitimate transactions, or if the transaction processing system allows fraudulent transactions that are later identified as being fraudulent, the need to perform further processing and/or take further control actions on such transactions imposes an overhead on the system/network and takes up valuable computing resources, networking bandwidth, etc.

Accordingly, more efficient systems and methods for configuring control actions are needed.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Embodiments provide methods, apparatuses, and computer-readable mediums for processing transactions using machine learning.

In an aspect, a method of training machine learning models is provided in a data processing system including at least one processor and at least one memory, the at least one memory including instructions executed by the at least one processor to process transactions. The method includes receiving a transaction, and forwarding the transaction to at least one of a plurality of integrated merchant control action models that use outputs of one model as inputs to other models. The plurality of integrated control action models are machine learning models jointly trained for taking each control action of a plurality of control actions on the transaction to maximize an objective function based on a probability of the plurality of control actions matching corresponding target control actions taken on the transaction. The plurality of integrated control action models include at least a risk model configured to output risk prediction information for a first control action that indicates whether or not to initiate processing of the transaction. The method further includes receiving the risk prediction information from the risk model, and executing at least the first control action based on the risk prediction information.

In a further aspect, a method is provided in a data processing system including at least one processor and at least one memory, the at least one memory including instructions executed by the at least one processor to process transactions using machine learning. The method may include receiving a current transaction and processing the current transaction by taking at least one control action using a joint learned model. The joint learned model includes at least a first learned model and a second learned model that are jointly trained for taking each control action of a plurality of control actions on at least one training transaction so as to maximize an expected value of an objective function associated with the at least one training transaction based on a probability of the plurality of control actions matching corresponding target control actions taken on the at least one training transaction using at least the first learned model and the second learned model.

In another aspect, a device in a data processing system for training machine learning models includes at least one processor and at least one memory in communication with the at least one processor, where the at least one memory includes instructions executed by the at least one processor to process transactions, including: receiving a transaction; forwarding the transaction to at least one of a plurality of integrated control action models that use outputs of one model as inputs to other models, where the plurality of integrated control action models are machine learning models jointly trained for taking each control action of a plurality of control actions on the transaction to maximize an objective function based on a probability of the plurality of control actions matching corresponding target control actions taken on the transaction, where the plurality of integrated control action models include at least a risk model configured to output risk prediction information for a first control action that indicates whether or not to initiate processing of the transaction; receiving the risk prediction information from the risk model; and executing at least the first control action based on the risk prediction information.

In a further aspect, a transaction processing apparatus may receive a current transaction and process the current transaction by taking at least one control action using a joint learned model. The joint learned model includes at least a first learned model and a second learned model that are jointly trained for taking each control action of a plurality of control actions on at least one training transaction so as to maximize an expected value of an objective function associated with the at least one training transaction based on a probability of the plurality of control actions matching corresponding target control actions taken on the at least one training transaction using at least the first learned model and the second learned model.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
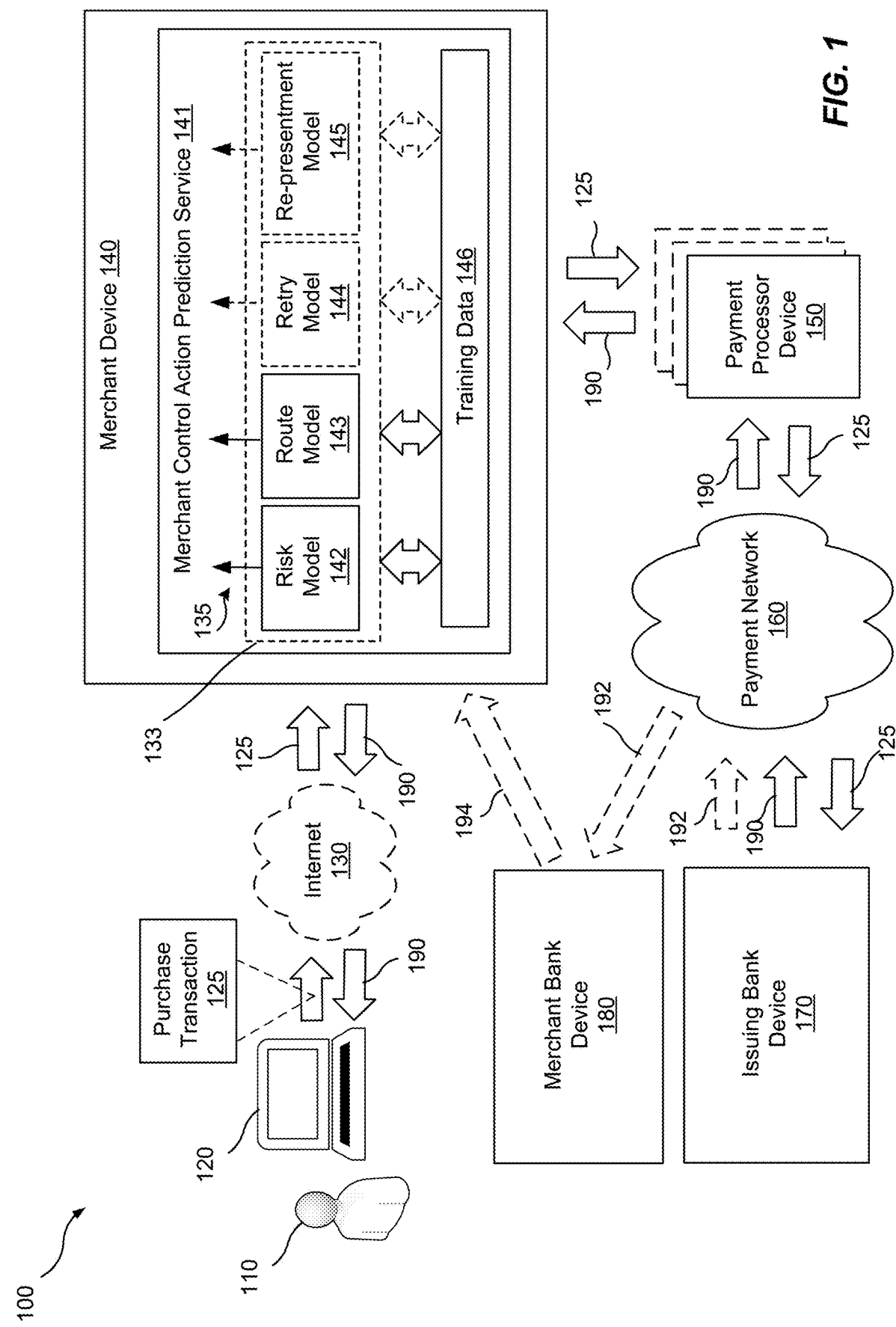
FIG. 1 is a block diagram of an example payment system, according to aspects of the present disclosure.

The detailed description set forth below in connection with the appended drawings is intended as a description of various configurations and is not intended to re-present the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

Aspects of the present disclosure provide jointly-trained integrated machine learning models used for taking control actions for processing transactions. In an aspect, the integrated machine learning models are jointly trained for taking control actions on a transaction to maximize an objective function based on a probability of the control actions matching corresponding target control actions. In an aspect, the integrated machine learning models are periodically re-trained, for example, re-trained every day, every week, every month, etc., based on historical control action data.

In one aspect, for example, a payment system includes a merchant control action service having a plurality of integrated, machine learning models that suggest one or more merchant control actions to a merchant, in response to a purchase transaction received by the merchant. In particular, integrated, machine learning models are trained such that the suggested merchant control actions are likely to maximize profits for the merchant in association with the purchase transaction. Such merchant control actions may include, but are not limited to, actions associated with determining a risk associated with proceeding with a purchase transaction, determining a route for processing the purchase transaction, and/or determining whether to retry a declined purchase transaction or dispute (re-present) a chargeback issued on a settled purchase transaction.

In an aspect, in the chain of events that happen during payment authorization/authentication and back office flow, the control actions available to the merchant are jointly/simultaneously optimized (i.e., co-optimized) by cooperating machine learning models of the present payment system to maximize profits. In an aspect, the merchant control action service optimizes the control actions together/jointly to leverage the statistical as well as causal dependencies between the success/failure of each of the control actions in matching corresponding target control actions that maximize profits of purchase transactions. Some aspects use supervised machine learning, semi-supervised machine learning, unsupervised machine learning, and/or a combination thereof to train the machine learning models to produce optimal decisions for each control action using the available features of the purchase transaction as well as the results of any previously taken control action. In an aspect, the cooperating models of the present payment system optimize a reward function associated with the expected profit from the purchase transaction. Such a reward function may account for parameters such as COGs, margins, chargeback fees, re-presentment fees, chargeback program penalties, etc.

The jointly trained machine learning models in the present aspects allow for taking improved control actions and making better decisions regarding transactions as compared to the known transaction processing systems. In some aspects, taking better control actions further results in taking fewer control actions overall and therefore reduces the computing resource requirements for processing the transactions. For example, by reducing the number of required communications for processing a transaction, the present aspects may reduce network traffic, eliminate redundant storage requirements, increase system operating efficiency, reduce storage costs, improve computer operations, etc. For example, the machine learning system in the present aspects may accurately predict how the banks will react to certain transactions, and therefore only sends out requests that are more likely to succeed. Further, the present aspects improve profits by improving the success rate (the settle rate) on good transactions and blocking bad transactions.

In an aspect, the payment system provides several control actions that a merchant may take to make respective decisions in determining whether and/or how to process a purchase transaction. For example, in an aspect, the decisions may include a risk decision, a route decision, a retry decision, a re-presentment decision, and/or other decisions. The risk decision indicates whether to allow the purchase transaction to proceed (e.g., whether to proceed with processing a payment for purchasing goods from the merchant). For example, the risk decision may be output by a risk model as a risk score, which can be compared to a risk threshold used to identify fraudulent transactions, so the resulting action of the risk decision is to "approve" or "reject" the transaction, although in some cases a transaction may be selected for manual review. If the purchase transaction is recommended to proceed by the risk decision, the route decision indicates which third party payment processor (e.g., Adyen, First Data Corp (FDC), PayPal, etc.) to use for processing the purchase transaction. For example, the routing decision may be output by a routing model as a routing score, which can be compared to one or more routing thresholds used to decide which processor (or gateway) to select to send this transaction to be processed to increase a settle rate. The routing decision only occurs in response to the transaction being approved by the risk model or manual review. The retry decision indicates whether to retry the purchase transaction if rejected by the processor. For example, the retry decision may be output by a retry model and is used in response to the transaction being declined by the bank in order to decide whether to retry the transaction or not. The retry decision may take into account two considerations: the chance to be approved if the transaction is retried on another processor, and the likelihood of receiving a chargeback if the retry is successful. If at a later time a chargeback is issued by the bank regarding the purchase transaction, the re-presentment decision indicates whether to dispute the chargeback i.e., re-present the chargeback to the bank. For example, the re-presentment decision may be output by a re-presentment model on the settled transactions in response to receiving a chargeback, and immediately provides a decision on re-presentment, e.g., whether or not to dispute the chargeback, and also provides re-presentment evidence if there is a re-presentment.

Turning now to the figures, examples are depicted with reference to one or more components and one or more methods that may perform the actions or operations described herein, where components and/or actions/operations in dashed line may be optional. Although the operations described below in one or more of the methods are presented in a particular order and/or as being performed by an example component, the ordering of the actions and the components performing the actions may be varied, in some examples, depending on the implementation. Moreover, in some examples, one or more of the described actions, functions, and/or components may be performed by a specially-programmed processor, a processor executing specially-programmed software or computer-readable media, or by any other combination of a hardware component and/or a software component capable of performing the described actions or functions.

FIG. 1 includes an example payment system 100 having a machine learning-based merchant control action prediction service 141 that provides electronic payment services to a merchant operating a merchant device 140 for evaluating and processing an online purchase transaction 125 associated with orders from a customer 110, according to an aspect of the disclosure. The merchant operating merchant device 140 may be any entity or device configured to sell a product or service, and the customer 110 may be any entity or device configured to pay for the product or service. For instance, when the customer 110 initiates the purchase transaction 125 via a web browser on a computer terminal 120, the merchant device 140 receives corresponding transaction information over the internet 130. Examples of the transaction information defined by or included in the purchase transaction 125 may include, but are not limited to, one or more of payment instrument information (e.g., credit or debit card type and account information), customer information (e.g., customer name, phone number, email address, etc.), merchant information, order or merchandise information, customer purchase history information, customer device fingerprinting information, customer device Internet Protocol (IP) address, etc. It should be noted that, for simplicity, FIG. 1 includes an example architecture of an online purchase transaction 125, e.g., received by the merchant over the Internet 130 (shown in dashed lines, indicating that it is optional), and of the merchant control action prediction service 141 being locally accessed by the merchant device 140. It should be understood, however, that the merchant control action prediction service 141 may be remotely accessed by the merchant device 140, such as via a wired and/or wireless communication network, including the Internet 130.

In an aspect, the merchant device 140 locally or remotely accesses the merchant control action prediction service 141 and uses one or more merchant control action models 133 to evaluate the purchase transaction 125 and produce prediction information 135 indicating whether or how to proceed with the purchase transaction 125, and/or providing information and recommendations as to whether or what information to communicate to relevant bank institutes regarding the purchase transaction 125. As mentioned above, in an aspect, the merchant control action prediction service 141 may be implemented locally, e.g., as software, hardware, and/or firmware executed by the merchant device 140. In a different aspect, the merchant control action prediction service 141 may be a remote service, such as a cloud service accessible to the merchant device 140 over the Internet 130, for example, via one or more application programming interfaces (APIs). In an aspect, the machine learning models implemented in the merchant control action prediction service 141 may include all or a subset of a risk model 142, a route model 143, a retry model 144, and/or a re-presentment model 145.

In an aspect, the merchant control action prediction service 141 trains each machine learning model using training data 146 that may include data output by another one of the machine learning models and/or data previously output by the same machine learning model. In an aspect, the merchant control action prediction service 141 uses the training data 146 to jointly/simultaneously train all or a subset of the machine learning models. For instance, the joint/simultaneous training means that the inputs and/or outputs of all the models may be integrated, e.g., such that the output of any given model may be used as an input to all or a subset of all of the other models.

In an aspect, the merchant control action prediction service 141 trains the machine learning models together/jointly to leverage the statistical as well as causal dependencies between the success/failure of each of the control actions in matching corresponding target control actions that maximize profits of purchase transactions. For example, the risk model 142 may be trained by determining the likelihood of fraud in a transaction while taking into consideration the likelihood of successful re-presentation in response to a chargeback on that purchase transaction as indicated by the re-presentment model 145. Likewise, the re-presentment model 145 may be trained by determining the likelihood of success of disputing the chargeback once receiving a chargeback on a purchase transaction while taking into consideration the likelihood of fraud in that transaction as indicated by the risk model 142. As another example, the route model 143 or the retry model 144 may be trained by determining the likelihood of successful settlement of a transaction when routed to and processed by a payment processor while taking into consideration the likelihood of fraud in that transaction as indicated by the risk model 142. For example, while it is preferable to route each transaction to a payment processor which is more likely to successfully approve the transaction, it is also preferable that the processor can help with declining high-risk transactions.

Further, in an aspect, the machine learning models may initially/simultaneously generate respective initial likelihoods of taking pre-defined target control actions (such as control actions that lead to a favorable outcome such as fraud detection, bank approval, win of a dispute, etc.). Then, based on each control action taken according to an output of a machine learning model, the likelihoods of taking the pre-defined target control actions by the subsequent machine learning models may be calibrated/updated. For example, the risk model 142 and the re-presentment model 145 may initially generate a likelihood of a respective one of a risk control action matching a pre-defined target risk control action and a re-presentment control action matching a pre-defined target re-presentment control action for a transaction. Then, after the risk control action is determined based on the likelihood determined by the risk model 142, the previously determined likelihood of the re-presentment control action matching a pre-defined target control action may be updated by the re-presentment model 145 accordingly. Also, after the re-presentment control action is taken based on the likelihood determined by the re-presentment model 145, the risk model 142 may be updated to provide improved outputs for similar transactions in the future. It should be noted that these examples are not to be construed as limiting, as the merchant control action prediction service 141 may have all of the one or more machine learning-based merchant control action models 133 update each of their prediction information 135 based on the output of each model in processing a single transaction. In other words, the prediction information 135 for all of the one or more machine learning-based merchant control action models 133 may include first prediction information upon the system first receiving the purchase transaction 125 for consideration, then second prediction information after the output of the risk control action based on the operation of the risk model 142, then third prediction information after the output of the routing control action based on the operation of the route model 143, and so on with respect to all outputs of all models that may act in an ordered manner on the given transaction. Accordingly, the control actions on a transaction are taken in real-time and affect each other, while the underlying machine learning models are trained periodically based on historical control action data.

Further details of operation of the machine learning models in the merchant control action prediction service 141 during processing of the purchase transaction 125 are provided later herein with reference to FIGS. 2 and 3.

The models of the merchant control action prediction service 141 may be trained using supervised machine learning, semi-supervised machine learning, unsupervised machine learning, and/or a combination thereof. Generally, in training a machine learning model using supervised learning, the model is presented with example, labeled inputs and their desired outputs so that the model is trained to learn a general rule that maps inputs to outputs. In training a machine learning model using unsupervised learning, no labels are given to the machine learning model such that the model determines on its own the structure of the input, where the model can discover hidden patterns in the input and/or learn more about predicting certain features (e.g., if the model has already been through supervised learning). In training a machine learning model using semi-supervised learning, both labeled and unlabeled data is provided to the model (e.g., starting the training by a small number of labeled data and then continuing the training by a large number of unlabeled data). Further details regarding the training of the machine learning models with the training data 146 are provided later herein with reference to FIG. 3.

In an aspect, the payment system 100 may additionally include one or more payment processors in communication on the payment system 100 via corresponding one or more payment processor devices 150 that may be available to the merchant to initially process the purchase transaction 125. A payment processor may be a third party company that handles transactions for a merchant bank in communication on the payment system 100 via a merchant bank device 180, e.g., a bank device of the bank used by the merchant. In an aspect, for example, when the customer 110 uses a credit card to make a payment in the purchase transaction 125 with the merchant device 140, the merchant device 140 sends the purchase transaction 125 to the payment processor device 150, which routes the purchase transaction 125 to a corresponding payment network 160 (which may be a credit card network when the purchase transaction 125 relates to a credit card purchase), which routes the purchase transaction 125 to an issuing bank device 170 of an issuing bank that has issued the credit card. In response, the issuing bank device 170 approves or declines the purchase transaction 125, and passes corresponding transaction results 190 back to the payment network 160, which passes the transaction results 190 to the payment processor device 150, which passes the transaction results 190 to the merchant device 140, which passes the transaction results 190 to the computer terminal 120 over the Internet 130 so that a real-time approval or decline of the purchase transaction 125 is displayed to the customer 110.

Further, if the issuing bank device 170 approves the purchase transaction 125, the issuing bank device 170 provides the required funds 192 to the payment network 160, which passes the funds 192 to the merchant bank device 180 to be deposited/settled in a merchant bank account at the merchant bank. The merchant bank device 180 may also send a notification 194 to the merchant device 140 indicating that the funds 192 have been received. In an aspect, in the foregoing, the payment processor device 150 and/or the issuing bank device 170 may also apply various anti-fraud measures on the purchase transaction 125 to prevent fraudulent transactions.

Figure 2:
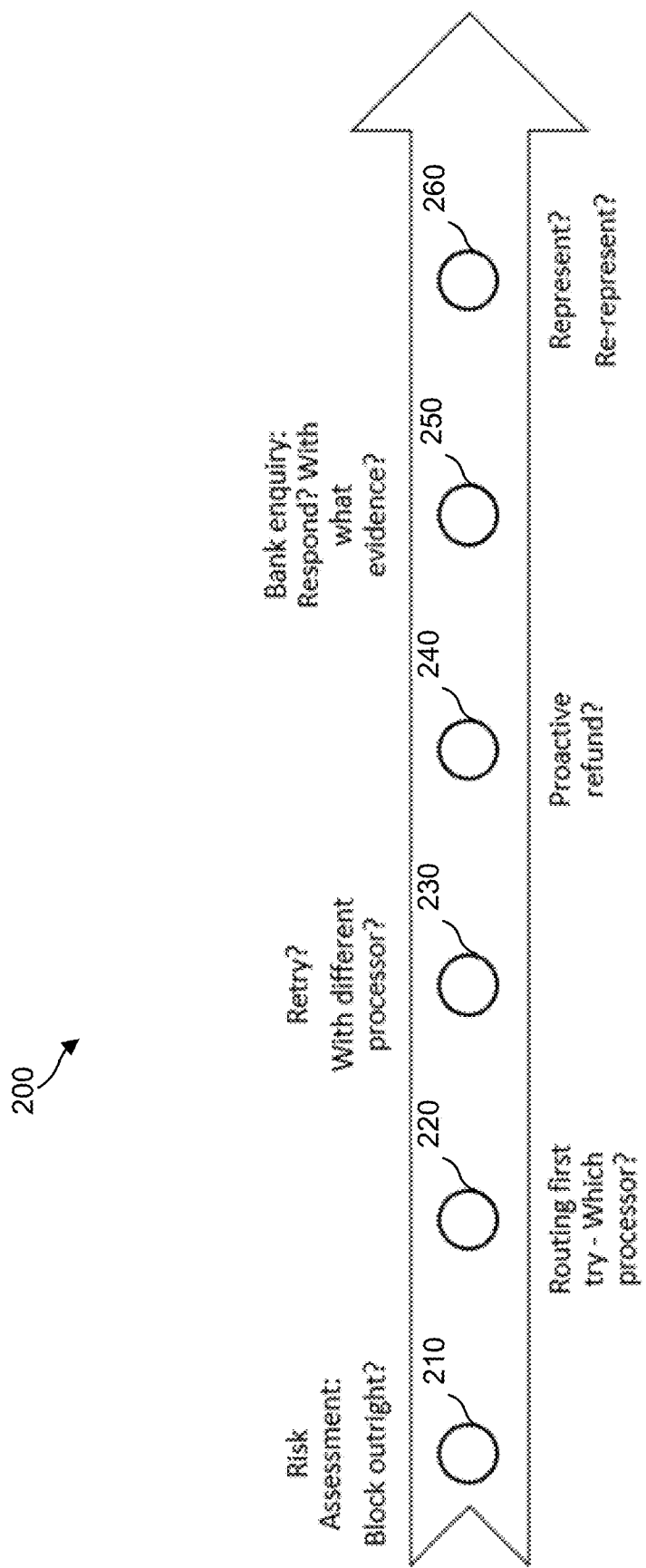
FIG. 2 is an example merchant decision flow, according to aspects of the present disclosure.

Referring now to FIG. 2, various aspects of an example merchant decision flow 200 are described below with reference to corresponding components in the example payment system 100 in FIG. 1. The example merchant decision flow 200 indicates example merchant control actions that the merchant and/or the merchant device 140 can execute within the payment system 100 in processing the purchase transaction 125, as guided by the merchant control action prediction service 141, according to an aspect of the disclosure. The example merchant control actions in chronological order include: (1) a risk control action 210 which is an input into the payment system 100 that determines whether or not to initiate processing of the purchase transaction 125, which may be decided using the prediction information 135 including a risk score calculated by the risk model 142 in the merchant control action prediction service 141 in response to receiving the purchase transaction 125; (2) a route control action 220 which is an input that determines which one out of a number of available payment processors 150 to choose to process an accepted purchase transaction 125, which may be decided using the prediction information 135 including a routing score calculated by the route model 143 in the merchant control action prediction service 141 in response to the risk control action 210 accepting the purchase transaction 125 for processing; (3) a retry control action 230 which is an input that determines whether or not to retry a declined purchase transaction 125 with the payment processor device 150 of a same or different payment processor, which may be decided using the prediction information 135 including a retry score calculated by the retry model 144 in the merchant control action prediction service 141 in response to receiving a denial or declined payment in response to a routed purchase transaction 125; (4) a proactive refund control action 240, which is an input into the payment system 100 that determines whether or not to attempt to refund a settled purchase transaction 125, based on the prediction information 135 including data the merchant and/or merchant device 140 may subsequently learn and that affects the determination that the already approved purchase transaction 125 presents a higher than initially expected risk of being denied or being fraudulent; (5) a bank enquiry control action 250, which is an input into the payment system 100 that determines, based on the prediction information 135, whether to respond to and/or what information to provide in response to a bank enquiry about a previously processed purchase transaction 125 that the customer 110 has subsequently flagged as fraudulent, potentially leading to a chargeback; and (6) a re-presentment control action 260, which is an input into the payment system 100 that determines whether to accept or oppose a chargeback of a previously processed purchase transaction 125 by the issuing bank device 170, which may be decided using the prediction information 135 including a re-presentment score calculated by the re-presentment model 145 in the merchant control action prediction service 141.

More specifically, in an aspect, the risk control action 210 indicates whether to block the purchase transaction 125 outright (when received from the customer 110) or to allow the purchase transaction 125 to proceed further with the payment system 100. In an aspect, for example, the risk model 142 of the merchant control action prediction service 141 may take into account the COG, the margin, and/or an assessed probability of fraud to determine the risk score to influence such decision.

In an aspect, assuming that more than one payment processor is available for processing the purchase transaction 125, the route control action 220 may be based on a route score determined by the route model 143 of the merchant control action prediction service 141, where the route score indicates which payment processor to use to send the purchase transaction 125 to the merchant bank device 180. In an aspect, the risk control action 210 may provide input to the route model 143 for determining the route control action 220, and hence contributes to the decision of the route control action 220. In addition, the route model 143 may take into account other factors (e.g., different processor fees) in determining the route score for recommending the route control action 220.

In an aspect, in the event that the purchase transaction 125 is sent to the issuing bank device 170 and gets rejected by the issuing bank device 170, the retry model 144 of the merchant control action prediction service 141 generates a retry score to indicate the retry control action 230, where the retry score indicates whether to retry (e.g., resubmit to the payment system 100) the purchase transaction 125 one or more times. In an aspect, the decisions of the risk control action 210 and the route control action 220 may be inputs to the retry model 114 and thus may affect the decision regarding the retry control action 230. For example, in an aspect, the retry control action 230 may be to retry submission of the purchase transaction 125, which may include choosing to route the purchase transaction 125 to the payment processor device 150 of a different payment processor as compared to the payment processor previously used for processing the purchase transaction 125.

In an aspect, the proactive refund control action 240, which may be a rule-based control action and/or a manual control action, indicates whether to pre-empt a chargeback on the purchase transaction 125 by performing a proactive refund of the payment to the issuing bank device 170. For example, in cases where it is later determined, e.g., as a result of batch mode manual review, that the purchase transaction 125, which the merchant and the issuing bank have previously approved, is likely to be fraudulent, the merchant device 140 may pre-empt the corresponding chargeback by performing a proactive refund of the payment to the issuing bank device 170. Accordingly, the pre-emptive refund may avoid substantial chargeback processing fees.

In an aspect, the bank enquiry control action 250, which may be a rule-based control action and/or a manual control action, indicates whether to respond to an enquiry by the issuing bank device 170 regarding the purchase transaction 125. For example, the issuing bank device 170 may enquire about the purchase transaction 125, when flagged by the customer 110, in order to gather data to decide whether to allow a corresponding chargeback to be filed. The bank enquiry may help to pre-empt friendly fraud and/or mistaken chargeback. The bank enquiry control action 250 allows the merchant device 140 to decide whether to respond to the bank enquiry and what evidence to provide in response to the bank enquiry, given that the ability to later re-present the purchase transaction 125 may be compromised by the data shared as evidence.

In an aspect, the re-presentment model 145 of the merchant control action prediction service 141 generates a re-presentment score to indicate whether or not to proceed with the re-presentment control action 260. The re-presentment score indicates whether to re-present the purchase transaction 125. For example, if a chargeback is issued regarding the purchase transaction 125, the merchant device 140 may re-present (e.g., fight) the chargeback by providing evidence to the issuing bank device 170 to establish that the purchase transaction 125 is legitimate and therefore the chargeback is not warranted. Both the decision to re-present or not, and the choice of data to furnish to the issuing bank device 170 as evidence for re-presentment, may be output by the re-presentment model 145, which may be based on information from previous control actions that have been taken by the merchant device 140. In an aspect, the re-presentment control action 260 may help the merchant device 140 to pre-empt friendly fraud and/or mistaken chargeback.

In an aspect, each of the merchant control actions, based on the prediction information 135 generated by the merchant control action prediction service 141, may be taken by the merchant device 140 in real-time or in near-real-time. As used herein, real-time indicates an event or process that is guaranteed to finish processing with less than a specified delay after a corresponding triggering event or process, and near-real-time indicates an event or process that is finished after the required processing time of the event/process has elapsed following a corresponding triggering event or process. For example, in an aspect, the issuing bank device 170 may issue a chargeback in near-real-time or make an enquiry in near-real-time (e.g., effectively at the same time as the customer initiates a chargeback or enquiry). For example, in an aspect, when a customer 110 calls the issuing bank to dispute the purchase transaction 125, the issuing bank device 170 may make an API call to the merchant device 140 to submit the corresponding information while the customer 110 is still on the dispute call, and the merchant device 140 via the merchant control action prediction service 141 may also provide re-presentment evidence back to the issuing bank device 170 in real-time or near-real-time so that the evidence can be reviewed by the issuing bank as the issuing bank is discussing the dispute with the customer 110. In an aspect, when the purchase transaction 125 is settled, the corresponding re-presentment evidence and score may be generated by the merchant control action prediction service 141 under the assumption that the purchase transaction 125 may be later disputed. In an alternative or additional aspect, the re-presentment evidence and score are generated (or refreshed if previously generated) by the merchant control action prediction service 141 at the time the merchant device 140 is notified that the customer 110 has disputed the purchase transaction 125.

Figure 3:
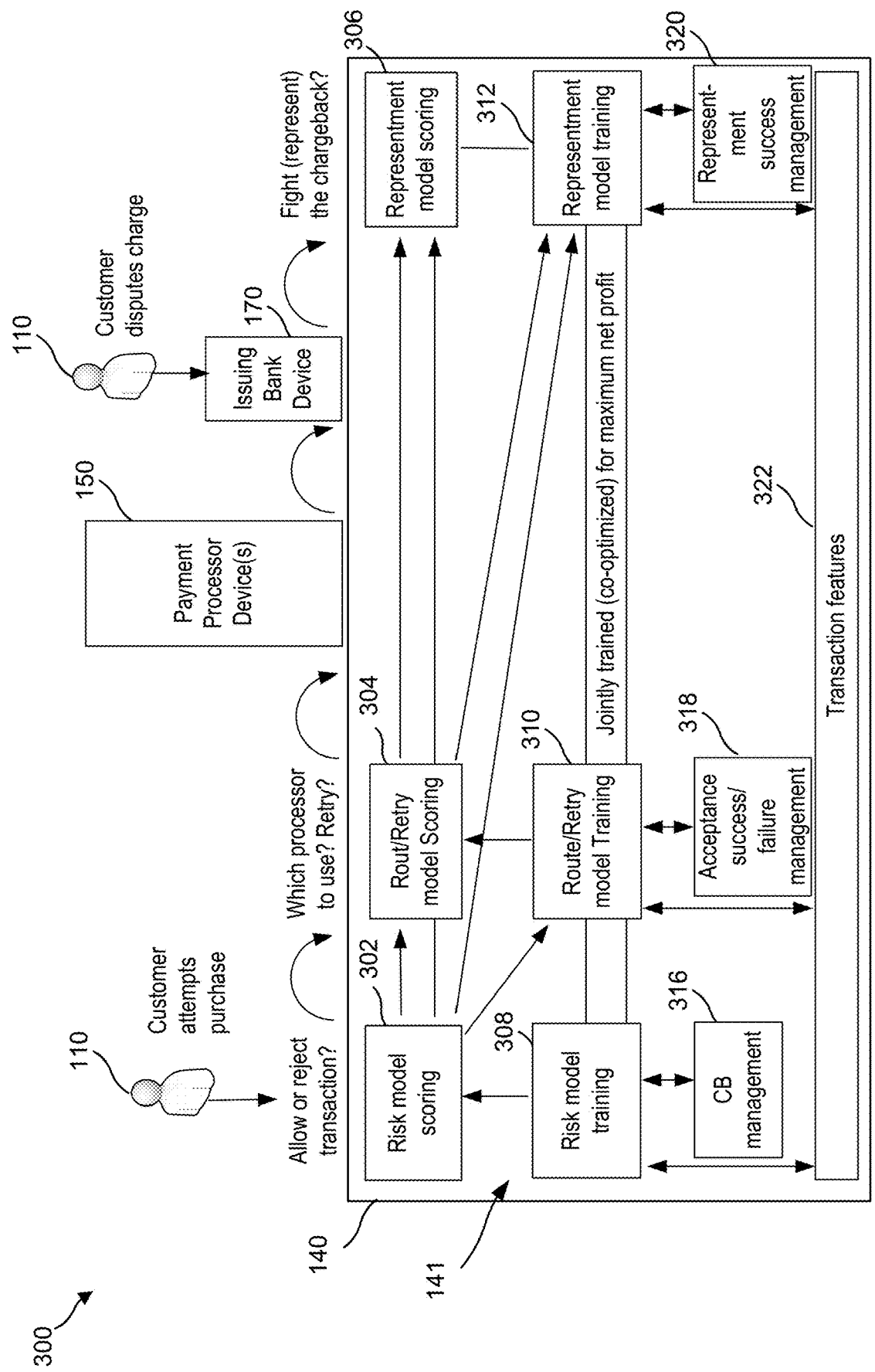
FIG. 3 is another block diagram of the example payment system of FIG. 1, according to aspects of the present disclosure.

Referring now to FIG. 3, an example operation of the merchant device 140 accessing the merchant control action prediction service 141 and executing various merchant control actions in processing a received purchase transaction 125 is described below with reference to corresponding components in the example payment system 100 in FIG. 1. In FIG. 3, the merchant device 140 via the merchant control action prediction service 141 implements various machine learning functionality for using relevant data to perform machine learning training on each of the merchant control action models and for using the trained models to perform model scoring and obtain model scores for taking respective merchant control actions. Specifically, the merchant device 140 may input a risk control action into the payment system 100 based on a risk score obtained by performing risk model scoring 302 using the risk model 142. The merchant device 140 may also input a route control action (or a retry control action) into the payment system 100 based on a route score (or a retry score) obtained by performing route/retry model scoring 304 using the route model 143 (or the retry model 144). The merchant device 140 may also input a re-presentment control action into the payment system 100 based on a re-presentment score obtained by performing re-presentment model scoring 306 using the re-presentment model 145. In an aspect, each one of the risk model scoring 302, the route/retry model scoring 304, and the re-presentment model scoring 306 is performed based on a respective machine learning model that may use data and/or results from any preceding models to inform the best merchant control action to be input by the merchant device 140.

In an aspect, supervised and/or semi-supervised machine learning may be applied to build each of the machine learning models. In an aspect, the merchant device 140 or owner or provider of the models performs risk model training 308 to train the risk model 142, performs route/retry model training 310 to train the route model 143 and/or the retry model 144, and performs re-presentment model training 312 to train the re-presentment model 145. In an aspect, the merchant device 140 or owner or provider of the models jointly/simultaneously performs (e.g., an output from at least one model is an input to at least one other model) the risk model training 308, the route/retry model training 310, and the re-presentment model training 312 to jointly train (co-optimize) the risk model 142, the route model 143, the retry model 144, and the re-presentment model 145 to maximize a net profit associated with processing the purchase transaction 125 in the payment system 100.

In an aspect, the merchant via the merchant device 140 applies various transaction features 322 for the risk model training 308, the route/retry model training 310, and the re-presentment model training 312. In an aspect, the merchant device 140 performs chargeback management 316 together with the risk model training 308, performs acceptance success/failure management 318 together with the route/retry model training 310, and performs re-presentment success management 320 together with the re-presentment model training 312. In an aspect, the risk model 142, the route model 143, the retry model 144, and/or the re-presentment model 145 may each perform real-time or near-real-time scoring by a corresponding machine learning model in production.

In an aspect, for example, the risk model 142 is used for performing real-time risk model scoring 302 to decide whether the purchase transaction 125 input by the customer 110 through a web browser on a computer terminal 120 should be approved or not, and the resulting risk score is used as an input to the route model 143 and/or to the retry model 144 to perform the route/retry model scoring 304. In an aspect, each one of the risk model 142, the route model 143, and the retry model 144 may be a gradient boosting tree model, a random forest, a neural network model, or any other suitable and applicable machine learning model known in the relevant arts. The route model 143 and the retry model 144 perform payment processor selection to select the payment processor device 150 to use for processing the purchase transaction 125 in a respective one of a first attempt or a retry. In an aspect, for example, instead of randomly picking the payment processor device 150, the route model 143 may select the payment processor device 150 according to merchant-owned information to gain a higher acceptance rate from the issuing bank device 170 for purchase transactions 125 that do not have a high risk score, and may send the purchase transactions 125 with high risk scores to the payment processors 150 that have lower chargeback fees. In an aspect, for a processor-rejected and/or bank-rejected purchase transaction 125, the retry model 144 re-scores the purchase transaction 125 by using the rejection reasons (e.g., machine-generated reason codes) and/or other information returned by the payment processor device 150 and/or the issuing bank device 170, or any other new data available, to select candidate payment processor devices 150 for retrying the purchase transaction 125.

Generally, there may be monetary upsides and downsides to the decisions made by the merchant device 140 in inputting each merchant control action. For example, choosing not to re-present the purchase transaction 125 results in incurring the COG loss. However, choosing to re-present a chargeback may also cost fees and there is no guarantee that the re-presentment will be successful. Further, even if the re-presentment of the purchase transaction 125 is successful, the recovered money (price of the product) may or may not cover the chargeback fees. Accordingly, when a chargeback is routed back from the issuing bank device 170, the merchant device 140 may use the re-presentment model 145 to select the purchase transactions 125 that are good re-presentment candidates. In an aspect, for example, once the purchase transaction 125 has been routed to the issuing bank device 170, the merchant device 140 may trigger the re-presentment model 145 to perform re-presentment model scoring 306 to recommend the purchase transactions 125 that are worth re-presenting and the corresponding explanations for re-presenting. In an alternative or additional aspect, when the purchase transaction 125 is disputed, the merchant device 140 triggers the re-presentment model 145 to perform re-presentment model scoring 306 to determine if the disputed purchase transaction 125 is worth re-presenting and the corresponding explanations for re-presenting.

Although four machine learning models are described with reference to FIGS. 1-3 above, other aspects of the present disclosure may implement fewer/more/different machine learning models for providing prediction information 135 to the merchant device 140 for controlling the execution of the same or different merchant control actions. For example, in an aspect, the merchant device 140 may only have access to the payment processor device 150 of a single payment processor, and therefore may not need to implement the route model 143 since all purchase transactions 125 will be routed to the payment processor device 150 of the same payment processor and there is no need for taking a route control action.

In an aspect, the risk model 142 is a machine learning model used for deciding, based on real-time scoring, whether the purchase transaction 125 should be approved or not. In an aspect, the risk score may be used as an input for the route model 143 and the retry model 144. In an aspect, after the customer 110 places an order, the risk model 142 is used to calculate a real-time risk score for the purchase transaction 125 based on various parameters, for example, transaction details, device fingerprinting, account history, customer and payment information, etc. In an aspect, the risk score is a number between 0 and 1, and is indicative of the probability of the purchase transaction 125 being fraudulent. The merchant device 140 may use the risk score and a dynamically selected score threshold (e.g., dynamically decided based on profits) for making merchant control action decisions such as whether to approve the purchase transaction 125. In an aspect, after the purchase transaction 125 is allowed to proceed based on a risk score calculated by the risk model 142, the merchant device 140 may further implement an acceptance model (not shown) that is a machine learning model that outputs an acceptance score indicative of the probability of approval of the purchase transaction 125 by the issuing bank device 170. In an aspect, for example, even if the purchase transaction 125 is not fraudulent, the issuing bank device 170 may still reject/decline the purchase transaction 125, for example, due to lack of funds, incorrect/incomplete information, expiration of a credit card, bank-specific policies, country-specific policies, etc. In an aspect, some other factors such as time of day, day of week, purchase amount, etc., may also impact the bank's decision.

In an aspect, the route model 143 is used by the merchant device 140 to choose a payment processor device 150 and/or to schedule routing. In an aspect, instead of random and/or manual selection of a payment processor device 150, the route model 143 is used to provide improved, more accurate, and faster processor selection in order to gain a higher acceptance rate from the issuing bank device 170. In an aspect, when the purchase transaction 125 is approved according to the risk score output by the risk model 142, the transaction information is routed to the payment processor device 150 selected using the route model 143. In an aspect, the payment processor device 150 calls the merchant bank device 180 to contact the issuing bank device 170 for obtaining transaction authorization results. In an aspect, the payment processor devices 150 of different payment processors (e.g., Ayden versus FDC) may obtain different responses from the issuing bank device 170. Accordingly, in an aspect, based on past routing history, each purchase transaction 125 is routed to a proper payment processor device 150 to increase the likelihood of getting a positive authorization response from the issuing bank device 170. In an aspect, in addition to processor selection, the routing schedule also affects the authorization outcome. For example, in an aspect, the hour of day, the day of week, and even the week of month in which the routing is performed may impact the authorization results. For example, in an aspect, a higher acceptance rate may be achieved for the purchase transactions 125 placed on a weekday as compared to purchase transactions 125 placed on a weekend.

In an aspect, the route model 143 is trained using supervised machine learning. In an aspect, the route model 143 may use various information such as processor information, routing schedule information, the risk score from the risk model 142, user account information, user device information, user payment information, etc., to compute a route score for each purchase transaction 125, each processor available for processing the purchase transaction 125, and each timing schedule available for routing the purchase transaction 125 if the purchase transaction 125 relates to a recurring purchase. Further, in an aspect, the route model 143 may use various aggregate/historical information such as historical fraud-related account information, recent IP information, historical payment and corresponding fraud information, etc., to compute the route score. In an aspect, for each candidate processor 150 and each candidate routing schedule for the purchase transaction 125, the calculated route score is indicative of the probability of the purchase transaction 125 being authorized by the issuing bank device 170 using the candidate payment processor device 150 and the candidate routing schedule. In an aspect, an accurate route model 143 may result in a higher bank acceptance rate.

In an aspect, all merchant-approved purchase transactions 125 (e.g., transactions which get a favorable risk control action) are routed to a payment processor device 150. The purchase transactions 125 accepted by the payment processor device 150 are then sent to the issuing bank device 170. The issuing bank device 170 provides a response which is either an acceptance or a decline of the purchase transaction 125. In an aspect, the issuing bank device 170 may use orthogonal/additional information to identify merchant-missed fraudulent purchase transactions 125. In some cases, banks and/or processor systems may perform inconsistent decision making which may lead to false declines of merchant-approved non-fraudulent purchase transactions 125. For example, some purchase transactions 125 may get declined by the issuing bank if received from one payment processor but accepted by the issuing bank if received from a different payment processor, because different payment processors may send different information to the issuing bank regarding the same transaction. Therefore, retrying the declined purchase transactions 125 (e.g., re-sending the purchase transaction 125 requests to the issuing bank device 170 through the payment processor device 150 of a different payment processor) may improve the bank acceptance rate. In an aspect, for example, the fraud rate in the retried purchase transactions 125 may be significantly higher (e.g., up to 10 times) than the non-retried purchase transactions 125.

Accordingly, in an aspect, for example, the number of risk score bins that have positive sub net revenue among the regular purchase transactions 125 is larger than the number of risk score bins that have positive sub net revenue among the retried purchase transactions 125. For example, in an aspect, assuming a higher risk score is indicative of a higher fraud risk, and assuming that each risk score is a number selected between 0 and 9999 such that when divided by 10000 provides the probability of fraud, a risk score lower than 3000 may retain a positive sub net revenue for regular purchase transactions 125, while by contrast, only a risk score lower than 700 may retain a positive sub net revenue for retried purchase transactions 125. Accordingly, in an aspect, a retry model 144 that properly re-scores the rejected purchase transactions 125 to select retry candidate purchase transactions 125 and retry payment processors 150 may significantly improve the bank acceptance rate and still maintain low fraud rate.

In an aspect, for example, an input data set of the retry model 144 for retrying the purchase transaction 125 may include the risk score of the purchase transaction 125 output by the risk model 142, the corresponding product/goods cost, the corresponding profit margin, and the rejection reasons provided by the previously used payment processor for processing the purchase transaction 125, so that the retry model 144 can compute a new retry score for the purchase transaction 125. In an aspect, the merchant device 140 does not initially have any retry success labels (i.e., data labels (e.g., "Yes/No" labels) assigned to transaction data to indicate whether corresponding transactions have been successfully retried, i.e., settled after being retried), and uses the expected profit as the criterion to decide whether the purchase transaction 125 should be re-sent/retried. In an aspect, the expected profit is defined as:

$$\text{Expect Profit} = (1-S)^* M - S^* C,$$

where S is the re-calibrated risk probability/score (re-calibrated based on the additional information related to the rejection of the purchase transaction 125), M is the product margin, and C is the product cost. Once sufficient retry success labels have been received, the retry model 144 may be established by using the input set, the retry processor information, the retry time/schedule information, and the retry result information. Thus, for every bank-rejected and/or processor-rejected purchase transaction 125, the retry model 144 provides a new retry score indicative of the probability that the purchase transaction 125 is re-sent to a particular bank or processor at a particular time and is accepted.

As described before, a chargeback refers to the return of funds to a card-holder, and is initiated by the issuing bank device 170 of the issuing bank of the instrument used by a card-holder to settle a debt. When the card-holder is asking the issuing bank to forcibly take money from the business's account (at the merchant bank), an investigation follows. If the bank determines that the card-holder's request is valid, funds are removed from the merchant's account and returned to the card-holder. Each time a card-holder files a chargeback, the merchant has two options: accept the chargeback, or fight it. If the merchant chooses to fight the chargeback, the merchant device 140 enters the process of re-presentment. Chargeback re-presentment refers to the process by which the merchant can dispute a chargeback by gathering evidence and other information to demonstrate that the purchase transaction 125 was completed properly. If there is sufficient evidence, the issuing bank then reverses the chargeback and the merchant does not have to pay back the funds. If the chargeback is not successfully re-presented, the merchant can elect arbitration, resulting in additional fees. Therefore, in an aspect, the merchant device 140 trains and uses the re-presentment model 145 to properly choose chargeback purchase transactions 125 to re-present, to re-present the selected chargeback quickly, and to provide good re-presentment evidence.

As described, the re-presentment model scoring 306 is performed using the re-presentment model 145. In an aspect, the re-presentment model 145 can quickly respond to a chargeback request and provide a re-presentment score for the corresponding settled purchase transaction 125 with evidence corresponding to the re-presentment score. In an aspect, the re-presentment score is indicative of the probability of winning back the chargeback for the merchant. In an aspect, based on available data on previously re-presented purchase transactions 125, the merchant device 140 uses an expected value of the potential win-back amount of the purchase transaction 125 to select the chargeback purchase transactions 125 to re-present. In an aspect, the expected value of the potential win-back amount of the purchase transaction 125 is $$P^*(A-F)-(1-P)^*C,$$

where P is the re-presentment score (e.g., indicating the probably that the merchant will win back the chargeback) generated by the re-presentment model 145, A is the win amount, C is the cost of the purchase transaction 125, and F is the re-presentment fee. If the re-presentment score is higher than a configured cut-off score and the expected value of the potential win-back amount of the purchase transaction 125 is higher than a threshold value configured by the merchant device 140, the chargeback purchase transaction 125 is selected as a good candidate to re-present.

In an aspect, when the purchase transaction 125 in a purchase process is settled, the merchant device 140 sends a request to the merchant control action prediction service 141 to get a re-presentment score and a corresponding explanation. If the issuing bank device 170 files a chargeback regarding the settled purchase transaction 125, the merchant device 140 receives the chargeback request and decides, based on the re-presentment score and the corresponding explanation, whether to select the purchase transaction 125 for re-presentment with evidence.

In an aspect, the merchant control action prediction service 141 uses the re-presentment model 145 to obtain the re-presentment score and a corresponding re-presentment explanation, such as the influential factors that lead to a specific score. In an aspect, the re-presentment model 145 is a machine learning model established on a binary classification model, which may be a gradient boosting tree model, a random forest model, or a neural network model, and with semi-supervised learning. In this aspect, the re-presentment model 145 is generated by first collecting training features from historical chargeback datasets. The training features may include, for example, account/customer's history, transaction information, device fingerprint, billing information, merchant ID, routed processor, risk score, and retry information if a retry has been performed on the transaction (e.g., retry score, retry time, and route information such as route score and processor name). In an aspect, when the merchant device 140 completes a settled purchase transaction 125, they receive extra payment information such as merchant ID, routed processor, and issuing bank, and this information is also included in the re-presentment model training dataset. Then, payment re-presentment results are used as a target variable to train the binary classification model. Finally, a score is predicted for some or all of the un-re-presented chargeback purchase transactions 125 based on the trained model, and a re-presentment score cutoff is defined to label some or all of the un-re-presented chargeback purchase transactions 125. Accordingly, chargeback purchase transactions 125 are at least partially labeled, and the resulting data is applied to train a final machine learning re-presentment model. Further aspects of such labeling functionality is described below with reference to FIG. 7.

In an aspect, the re-presentment model 145 is trained to generate re-presentment explanations based on characteristics of the gradient boosting tree algorithm. In an aspect, the re-presentment model 145 is generated by first training a prior probability based on a training population, and creating a human-explained feature mapping table that maps each attribute created by the risk system to a human-understandable explanation. As a result, the re-presentment model 145 can automatically choose an appropriate explanation for important attributes. Then, the prior probability and the output of the gradient boosting tree are used to calculate the contribution of each attribute, and the top contributor attributes from the feature contribution are mapped to the human-explained feature mapping table. Further aspects related to the explanation codes are described below with reference to FIG. 8.

Figure 4:
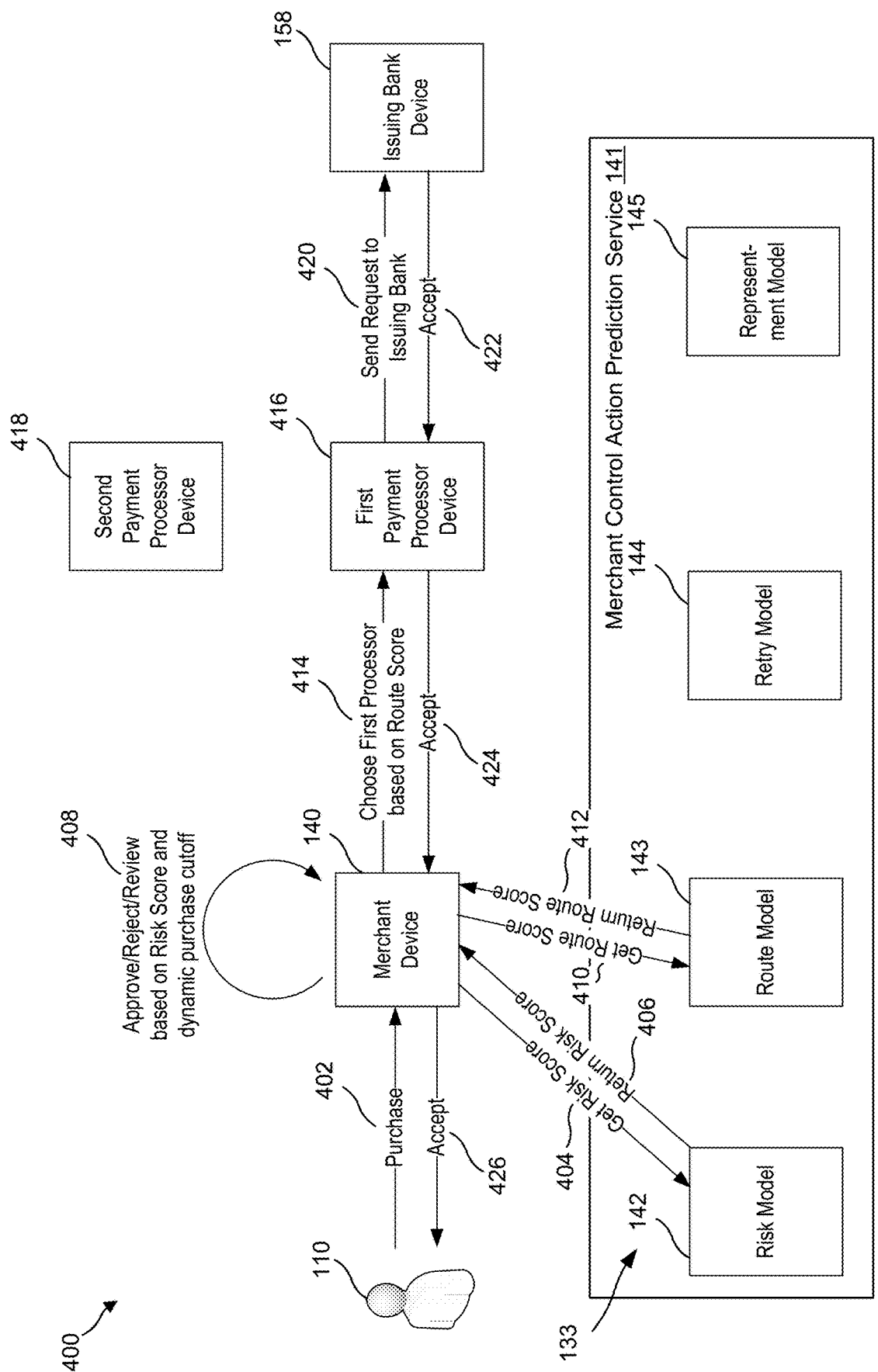
FIG. 4 is an example risk and routing flow, according to aspects of the present disclosure.

FIG. 4 is an example merchant risk and route flow 400 where the purchase transaction 125 is accepted by the merchant device 140 and the first attempt at routing the purchase transaction 125 leads to acceptance of the purchase transaction 125, according to an aspect of the present disclosure. Aspects of FIG. 4 are described below with reference to corresponding components in the example payment system 100 in FIG. 1. At 402 a customer 110 starts the purchase transaction 125 to make a purchase from the merchant, e.g., via the merchant device 140. At 404 the merchant device 140 sends a request to the risk model 142 to obtain a risk score for the purchase transaction 125. At 406 the risk model 142 returns the risk score to the merchant device 140. At 408 the merchant via the merchant device 140 makes a decision (e.g., approve, reject, review, etc.) on the purchase transaction 125 based on the risk score and a dynamically determined risk score threshold (e.g., a purchase risk score cutoff dynamically decided based on profits and other conditions). If the merchant via the merchant device 140 decides to approve the purchase transaction 125, at 410 the merchant device 140 sends a request to the route model 143 to obtain a route score. At 412 the merchant device 140 receives the route score from the route model 143. At 414, among two payment processors available for processing the purchase transaction 125 (e.g., represented by a first payment processor device 416 and a second payment processor device 418), the merchant via operation of the merchant device 140 chooses the first payment processor device 416 based on the route score. At 420 the first payment processor device 416 sends the transaction request to the issuing bank device 170. At 422 the issuing bank device 170 accepts the purchase transaction 125. At 424 the first payment processor device 416 sends a message to the merchant device 140 indicating that the purchase transaction 125 has been accepted by the issuing bank device 170. At 426 the merchant device 140 accepts the customer's purchase transaction 125.

Figure 5:
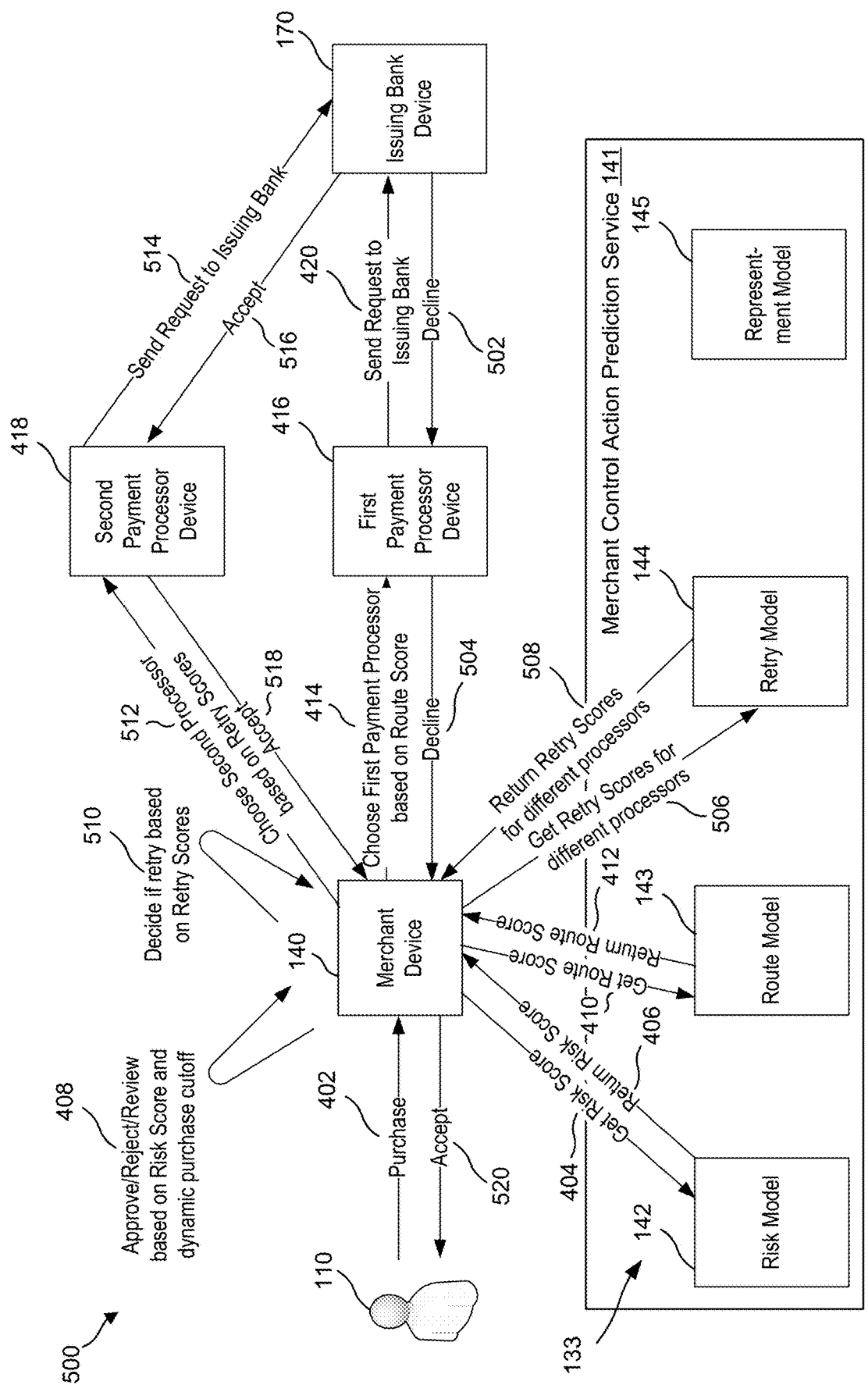
FIG. 5 is an example retry flow, according to aspects of the present disclosure.

FIG. 5 is an example merchant retry flow 500 where the purchase transaction 125 is accepted by the merchant via the merchant device 140 but the first attempt at routing the purchase transaction 125 leads to rejection of the purchase transaction 125 followed by a retry attempt which is then successful (i.e., the retry leads to a settlement of the purchase transaction 125), according to an aspect of the present disclosure. Aspects of FIG. 5 are described below with reference to corresponding components in the example payment system 100 in FIG. 1. The example merchant retry flow 500 includes the same functionalities at 402, 404, 406, 408, 410, 412, 414, and 420 as in the example merchant risk and route flow 400 in FIG. 4. However, in FIG. 5, at 502 the issuing bank device 170 declines the purchase transaction 125. At 504 the first payment processor device 416 sends a message to the merchant device 140 indicating that the purchase transaction 125 has been declined. At 506 the merchant device 140 sends a message to the retry model 144 to obtain retry scores for other available payment processors different than the first payment processor 416. At 508 the retry model 144 returns retry scores for the other available payment processors. At 510 the merchant device 140 decides whether to retry the purchase transaction 125 based on the retry score returned by the retry model 144. At 512 the merchant device 140 chooses a second payment processor device 418 for a retry based on the retry scores. At 514 the second payment processor device 418 sends the transaction request to the issuing bank device 170. At 516 the issuing bank device 170 accepts the purchase transaction 125. At 518 the second payment processor device 418 sends a message to the merchant device 140 indicating that the purchase transaction 125 has been accepted. At 520 the merchant device 140 accepts the customer's purchase transaction 125.

Figure 6:
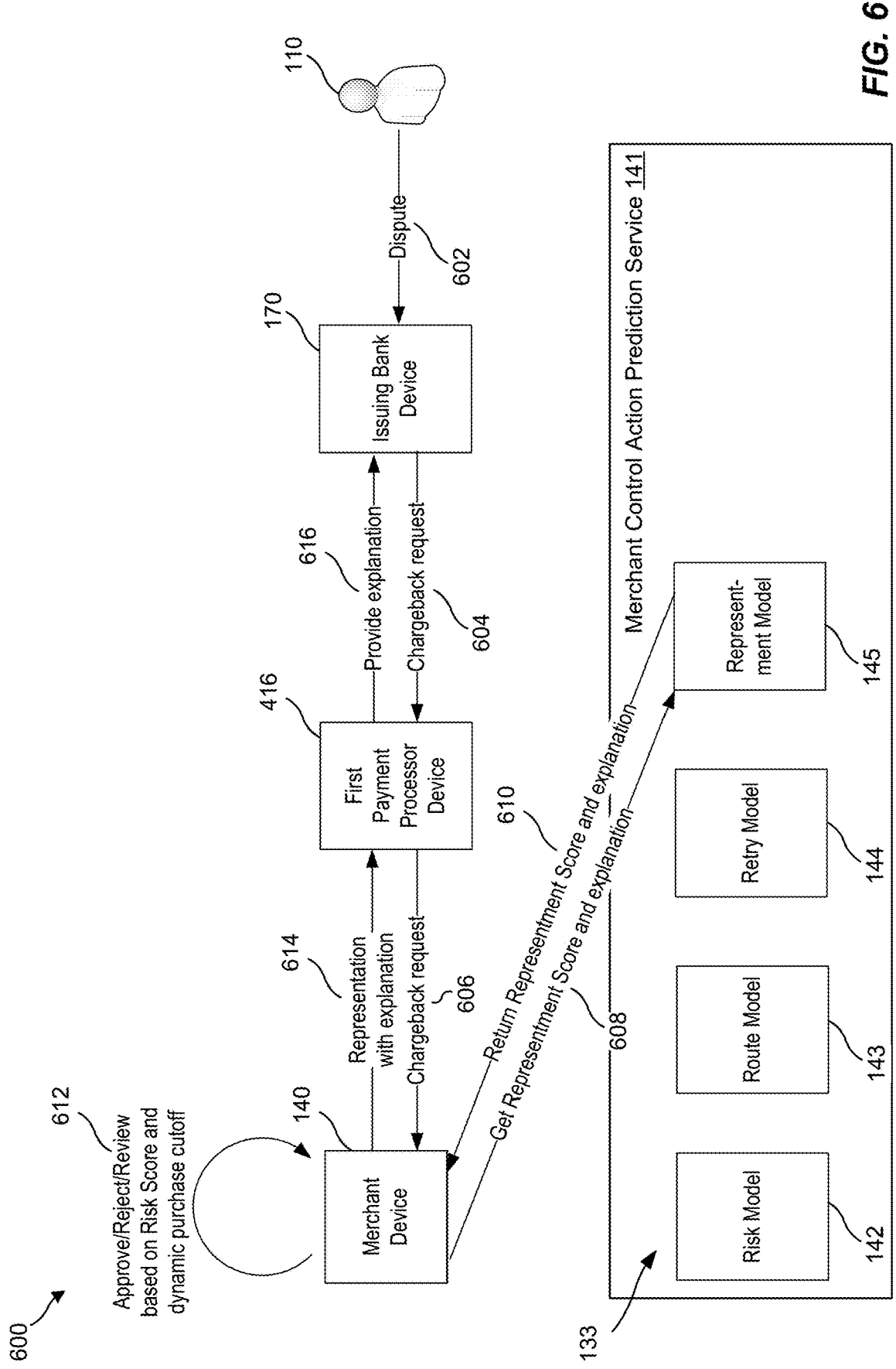
FIG. 6 is an example re-presentment flow, according to aspects of the present disclosure.

FIG. 6 is an example merchant re-presentment flow 600 where the customer 110 disputes a settled purchase transaction 125 after the example merchant risk and route flow 400 in FIG. 4 is completed, according to an aspect of the present disclosure. Aspects of FIG. 6 are described below with reference to corresponding components in the example payment system 100 in FIG. 1. At 602 the customer 110 sends a message to the issuing bank device 170 to dispute the settled purchase transaction 125. At 604 the issuing bank device 170 sends a chargeback request to the first payment processor device 416 which had processed the purchase transaction 125. At 606 the first payment processor device 416 sends the chargeback request to the merchant device 140. At 608 the merchant device 140 sends a request to the re-presentment model 145 to obtain a re-presentment score and a corresponding re-presentment explanation. At 610 the re-presentment model 145 returns the re-presentment score and the corresponding explanation. At 612 the merchant via operation of the merchant device 140 decides whether to re-present the purchase transaction 125 based on the re-presentment score and a dynamically determined re-presentment score threshold (re-presentment cutoff). At 614 the merchant device 140 sends a re-presentment message with the re-presentment explanation to the first payment processor device 416. At 616 the first payment processor device 416 re-presents the purchase transaction 125 to the issuing bank device 170 with the re-presentment explanation.

Figure 7:
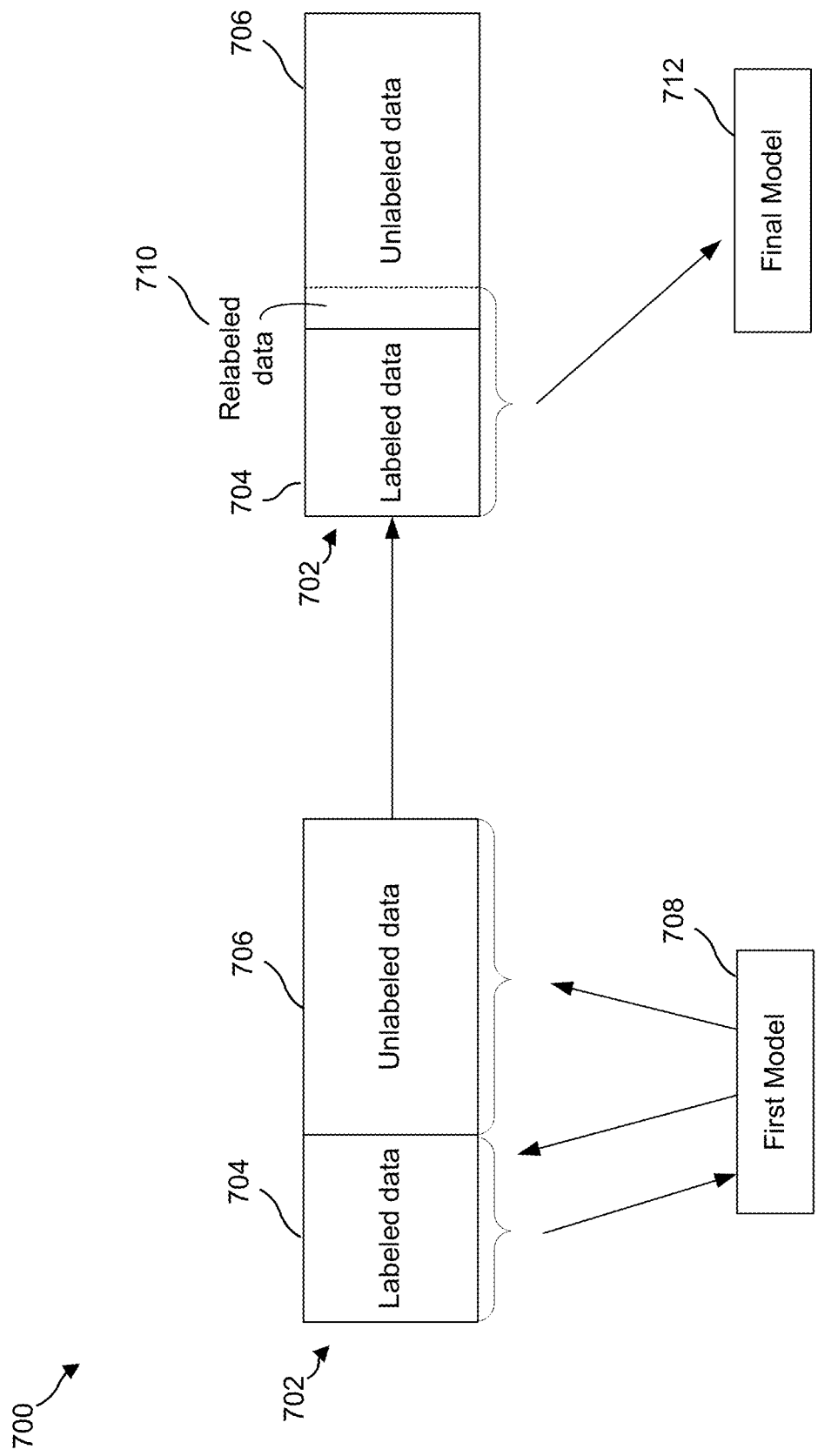
FIG. 7 is an example block diagram of semi-supervised learning, according to aspects of the present disclosure.

Referring now to FIG. 7, an example block diagram 700 illustrating the labeling of historical chargeback data 702 for semi-supervised training of the re-presentment model 145 by the merchant control action prediction service 141 is provided. In an aspect, in the historical chargeback data 702, some chargeback transactions may have been re-presented and may have been subsequently won. The data labels for re-presentment model training are therefore "won/not won." Since only some and not all received chargebacks are re-presented, the labels are not complete, and the historical chargeback data 702 includes labeled data 704 and unlabeled data 706. Accordingly, the merchant control action prediction service 141 may apply semi-supervised learning on a first model 708, which may be a first version of the re-presentment model 145 before training, to label some or all of the unlabeled data 706. In an aspect, in the unlabeled data 706, the number of high score transactions and their corresponding purchase amount is small, and therefore the expected value of the profit from the unlabeled data 706 is small compared to the labeled data 704. Further, the information in the unlabeled data 706 may not be useful for model training. Accordingly, the merchant control action prediction service 141 may relabel only a subset of the unlabeled data 706.

Specifically, the merchant control action prediction service 141 may use the labeled data 702 to train the first model 708, apply the first model 708 on the labeled data 708 to obtain predicted re-presentment scores, and use the predicted re-presentment scores to determine high cutoff and low cutoff re-presentment score thresholds. The merchant control action prediction service 141 may then apply the first model 708 to the unlabeled data 704 to obtain respective estimated re-presentment scores. For each chargeback transaction in the unlabeled data 704, if the estimated re-presentment score is higher than the high cutoff threshold, the merchant control action prediction service 141 assigns a "won" label, and if the estimated re-presentment score is lower than the low cutoff threshold, the merchant control action prediction service 141 assigns a "not won" label, thus generating relabeled data 710. Then, the merchant control action prediction service 141 uses the labeled data 702 and the relabeled data 710 to train a final model 712, which may be used as a trained version of the re-presentment model 145.

Some aspects generate feature-wise contributions and return re-presentment reason codes/explanation using gradient boosting decision trees (such as a "FastTree" provided by Microsoft open source "ML.net"). A re-presentment explanation code is used as the explanation for a re-presentment score, for example, to provide evidence to show why a chargeback transaction is not a fraud. In an aspect, human-understandable reason codes provide a mapping between the original features in the decision tree to "high level" explanation codes for better explanation. In an aspect, the merchant control action prediction service 141 generates feature mapping and a human-understandable code table for categorical and numerical data.

Figure 8:
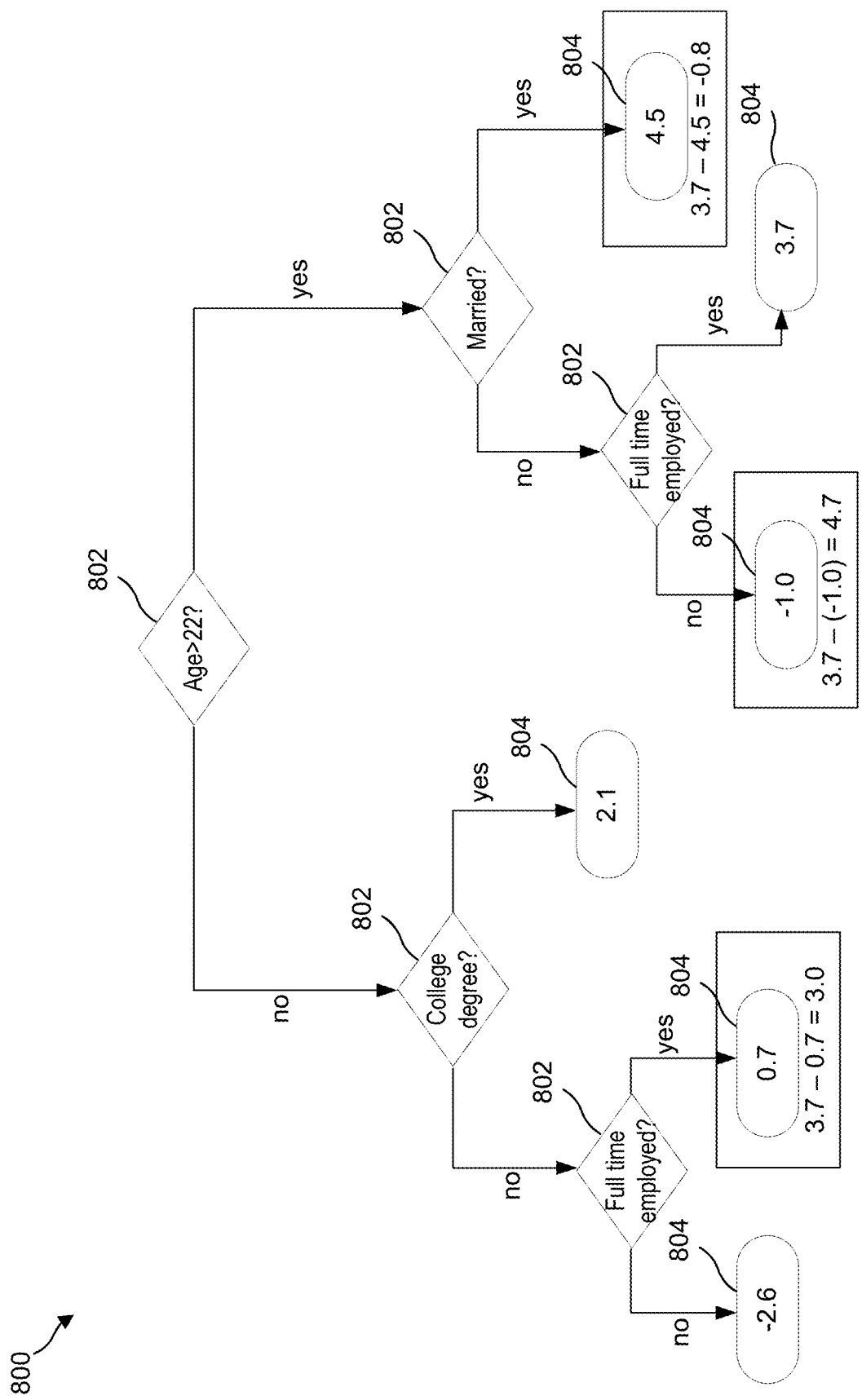
FIG. 8 is an example reason code algorithm, according to aspects of the present disclosure.

FIG. 8 illustrates an example reason code algorithm 800 which may be implemented by a gradient boosting decision tree in an aspect. The reason code algorithm 800 may include a number of threshold questions 802 having "Yes/No" decisions that lead to other threshold questions 802 and/or to scores 804 output by leaves of the example reason code algorithm 800 for certain combination of features. In an aspect, the feature-wise contributions of the features that lead to a certain score 804 may also be determined based on the example reason code algorithm 800. In an aspect, for example, the threshold questions 802 may include "Age>22?", "College degree?", "Full time employed?", "Married?", etc. In an aspect, for example, the merchant control action prediction service 141 may use the reason code algorithm 800 to obtain the example feature-wise contributions in Table 2 below based on the example customer features in Table 1 below. In this aspect, the score 804 for "Age>22? Yes," "Married? No," and "Full time employed? No" is "−1." In order to determine the feature-wise contribution of "Full time employed," since the score 804 for "Age>22 Yes," "Married? No," and "Full time employed? No" would have been "3.7," the feature-wise contribution of "Full time employed" in the score 804 of "3.7" may be calculated as "3.7−(−1.0)=4.7." Accordingly, the merchant control action prediction service 141 may use the reason code algorithm 800 to determine a feature-wise contribution value for each feature used in determining the score 804. Then, the merchant control action prediction service 141 may rank the features based on their importance as indicated by their feature-wise contribution, select those features with the highest feature-wise contributions, and map the selected features to human-understandable names based on a feature mapping table.

TABLE 1

Example Features

| Age | 31 |
|---|---|
| Married | No |
| Full-time employed | Yes |
| College degree | No |

TABLE 2

Example feature-wise contributions

| Age | +3.0 |
|---|---|
| Married | −0.8 |
| Full-time employed | +4.7 |
| College degree | 0 |

The following provides example results including a re-presentment score and corresponding explanation results for a chargeback transaction. The explanation results include a predicted score within the range (0, 9999] and three explanation codes each having (1) a human-understandable "FriendlyName" attribute that identifies a human-understandable name of a particular feature (e.g., the name of a bank, or a type of payment information (PI), or a merchant identifier (ID)), (2) a "Name" attribute providing the column name in the feature mapping table, and (3) a "Value" attribute providing the column value in the feature mapping table. In an aspect, for example, the merchant control action prediction service 141 may compare the below re-presentment score to a threshold to decide whether to re-present a corresponding chargeback by providing re-presentment explanations based on the below explanation codes.

```
{
    "Score": 6574,
    "ExplanataionCodes": [
    {
        "FriendlyName": "Bank Name",
        "Name": "s_BankGroup",
        "Value": "bancorpsouth bank"
    },
    {
        "FriendlyName": "PI type",
        "Name": "s_PaymentMethodType",
        "Value": "amex"
    },
    {
        "FriendlyName": "Merchant ID",
        "Name": "s_MID",
        "Value": "a1639ebr101"
    }
    [
}
```

Figure 9:
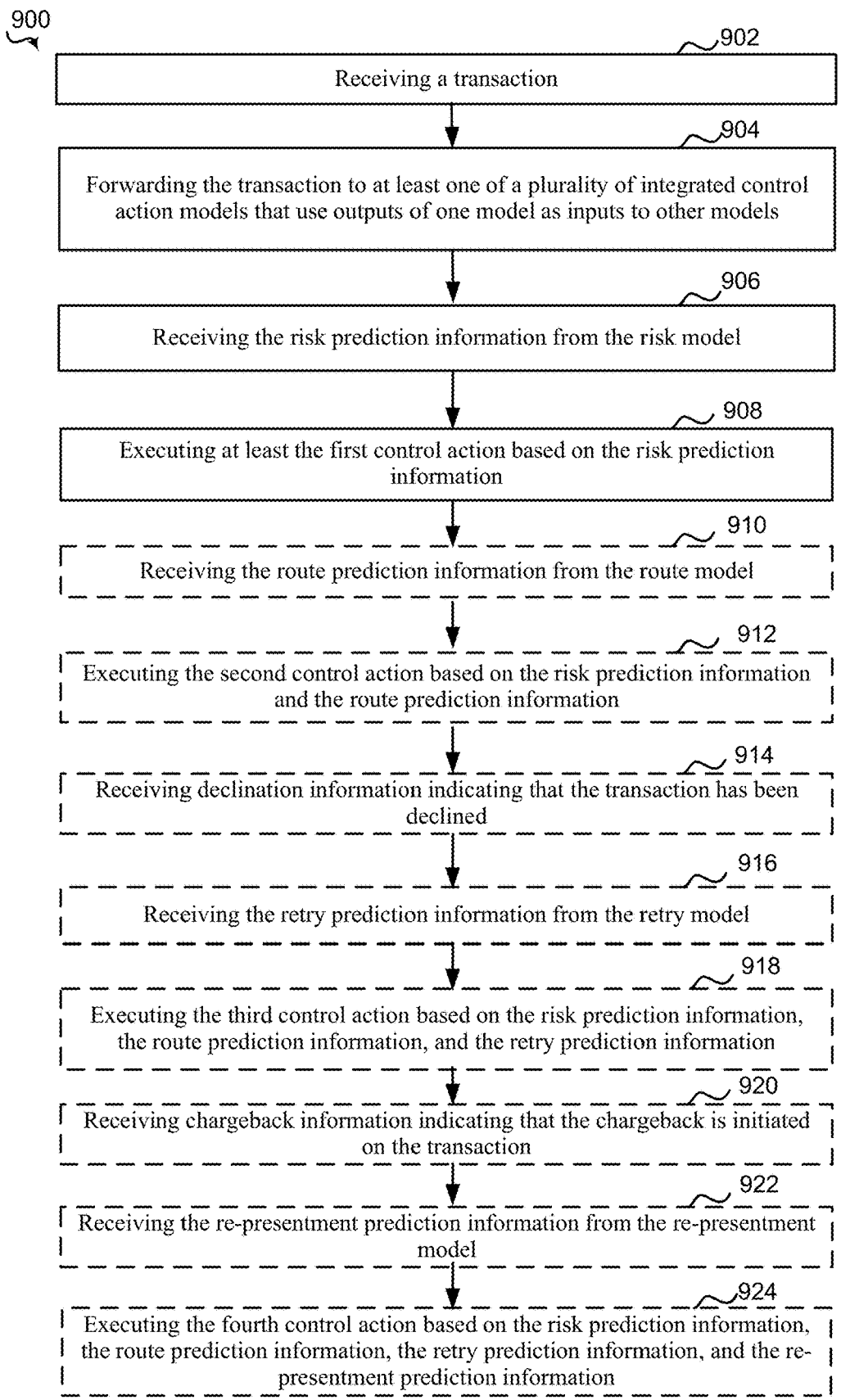
FIGS. 9 and 10 are flowcharts of example methods performed by the system of FIG. 1, according to aspects of the present disclosure.
Figure 10:
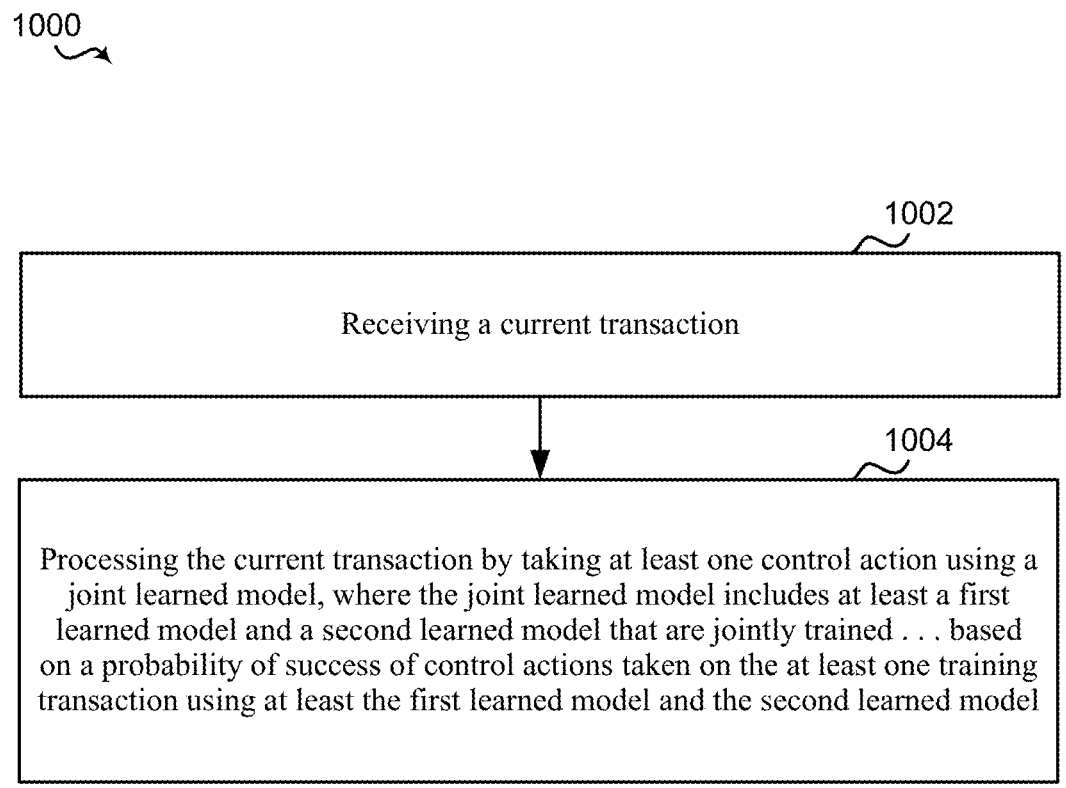

FIGS. 9 and 10 provide flowcharts of example payment processing methods 900 and 1000 of training machine learning models, in a data processing system including at least one processor and at least one memory, the at least one memory including instructions executed by the at least one processor to process transactions using machine learning. The following description of the example payment processing methods 900 and 1000 makes reference to the systems and components described above. For example, each one of the example payment processing methods 900 and 1000 may be performed by components of the example payment processing system 100, and is accordingly described with reference to FIGS. 1-6, as non-limiting examples of an environment for carrying out each one of the example payment processing methods 900 and 1000. Additionally, each one of the example payment processing methods 900 and 1000 may be implemented on a computing device (see e.g., computing device 10 of FIG. 11) operating in the example payment processing system 100, and subcomponents of the computing device may also be described below.

Referring first to FIG. 9, at 902 the method 900 may include receiving a transaction.

For example, in an aspect, the computing device 10 that implements the merchant device 140 may receive the purchase transaction 125 from a computer terminal 120.

At 904 method 900 includes forwarding the transaction to at least one of a plurality of integrated control action models that use outputs of one model as inputs to other models. For example, in an aspect, the computing device 10 that implements the merchant device 140 may forward the purchase transaction 125 to the merchant control action prediction service 141 for processing by one of the machine learning models implemented by the merchant control action prediction service 141, where at least one of such machine learning models uses at least an output of another model as an input. In an aspect, the integrated merchant control action models implemented by the merchant control action prediction service 141 are machine learning models that are jointly trained for taking each control action of a plurality of control actions on the transaction to maximize an objective function based on a probability of the plurality of control actions matching corresponding target control actions taken on the purchase transaction 125. In an aspect, for example, the objective function is an expected value of a profit associated with the purchase transaction 125.

In an aspect, the plurality of integrated merchant control action models implemented by the merchant control action prediction service 141 include at least a risk model 142 configured to output risk prediction information for a first control action such as the risk control action 210 that indicates whether or not to initiate processing of the purchase transaction 125.

At 906 method 900 includes receiving the risk prediction information from the risk model 142. For example, in an aspect, the merchant device 140 receives the risk prediction information such as a risk score from the risk model 142.

At 908 method 900 includes executing at least the first control action based on the risk prediction information. For example, in an aspect, the merchant device 140 executes the risk control action 210 based on the risk score received from the risk model 142.

Optionally, the plurality of integrated control action models may further include a route model 143 that outputs route prediction information for a second control action that indicates a payment processor to process the transaction if initiated. Optionally, at 910 method 900 includes receiving the route prediction information from the route model 143. For example, in an aspect, if the risk control action 210 allows the purchase transaction 125 to proceed further, and if there are more than one payment processors 150 available for processing the purchase transaction 125, the merchant device 140 receives the route prediction information such as the route score for each available payment processor device 150 from the route model 143.

Optionally, at 912 method 900 includes executing the second control action based on the risk prediction information and the route prediction information. For example, in an aspect, the merchant device 140 executes the second merchant control action such as the route control action 220 based on the risk prediction information such as the risk score and the route prediction information such as the route score for each available payment processor device 150.

Optionally, in an aspect, the plurality of integrated merchant control action models further include a retry model, and the retry model outputs retry prediction information for a third control action that indicates whether or not to retry the transaction if declined. For example, in an aspect, the plurality of integrated merchant control action models implemented by the merchant control action prediction service 141 further include the retry model 144 that outputs retry prediction information such as a retry score for a third merchant control action such as the retry control action 230 that indicates whether or not to retry the purchase transaction 125 if declined by the issuing bank device 170.

Optionally, at 914 method 900 includes receiving declination information indicating that the transaction has been declined. For example, in an aspect where the purchase transaction 125 is declined by the issuing bank device 170, the merchant device 140 may receive declination information from the payment processor device 150 indicating that the purchase transaction 125 has been declined.

Optionally, at 916 method 900 includes receiving the retry prediction information from the retry model. For example, in an aspect, the merchant device 140 may receive the retry prediction information such as a retry score from the retry model 144.

Optionally, at 918 method 900 includes executing the third control action based on the risk prediction information, the route prediction information, and the retry prediction information. For example, in an aspect, the merchant device 140 may execute the third merchant control action such as the retry control action 230 based on the risk prediction information such as the risk score received from the risk model 142, the route prediction information such as the route score received from the route model 143, and the retry prediction information such as the retry score received from the retry model 144.

Optionally, in an aspect, the plurality of integrated merchant control action models further include a re-presentment model, and the re-presentment model outputs re-presentment prediction information for a fourth control action that indicates whether or not to re-present the transaction if a chargeback is initiated. For example, in an aspect, the plurality of integrated merchant control action models implemented by the merchant control action prediction service 141 further include the re-presentment model 145 that outputs re-presentment prediction information such as a re-presentment score for a fourth merchant control action such as the re-presentment control action 260 that indicates whether or not to re-present the purchase transaction 125 if a chargeback is initiated on the purchase transaction 125 after the purchase transaction 125 has been settled.

Optionally, at 920 method 900 includes receiving chargeback information indicating that the chargeback is initiated on the transaction. For example, in an aspect, the merchant device 140 may receive chargeback information from the payment processor device 150 indicating that the chargeback is initiated on the purchase transaction 125.

Optionally, at 922 method 900 includes receiving the re-presentment prediction information from the re-presentment model. For example, in an aspect, the merchant device 140 may receive the re-presentment prediction information such as a re-presentment score from the re-presentment model 145. In an aspect, the merchant device 140 may also receive a corresponding re-presentment explanation from the re-presentment model 145.

Optionally, at 924 method 900 includes executing the fourth control action based on the risk prediction information, the route prediction information, the retry prediction information, and the re-presentment prediction information. For example, in an aspect, the merchant device 140 may execute the fourth merchant control action such as the re-presentment control action 260 based on the risk prediction information such as the risk score returned by the risk model 142, the route prediction information such as the route score returned by the route model 143, the retry prediction information such as the retry score returned by the retry model 144, and the re-presentment prediction information such as the re-presentment score returned by the retry model 145.

Referring now to FIG. 10, at 1002 the method 1000 may include receiving a current transaction. For example, in an aspect, the merchant device 140 of a merchant may receive the purchase transaction 125 from the web browser on a computer terminal 120 used by the customer 110 to process the purchase transaction 125 corresponding to the purchase of merchandise/goods/services provided for sale by the merchant.

At 1004 the method 1000 may include processing the current transaction by taking at least one control action using a joint learned model. For example, in an aspect, the merchant device 140 may process the customer's transaction request by taking a merchant control action using a joint machine learning model implemented by the merchant control action prediction service 141. For example, in an aspect, the merchant device 140 may make an API call to the merchant control action prediction service 141 to use one or more of the jointly trained machine learning models implemented at the merchant control action prediction service 141.

In an aspect, the joint learned model includes at least a first learned model and a second learned model that are jointly trained for taking each control action of a plurality of control actions on at least one training transaction so as to maximize an expected value of an objective function associated with the at least one training transaction based on a probability of the plurality of control actions matching corresponding target control actions taken on the at least one training transaction using at least the first learned model and the second learned model. For example, in an aspect, the joint learned model may be defined by the merchant control action prediction service 141 and may include the risk model 142 and another model such as the route model 143 or the re-presentment model 145. In another aspect, the joint learned model may include the risk model 142, the route model 143, the retry model 144, and the re-presentment model 145. In an aspect, for example, the joint learned model includes the risk model 142 and the re-presentment model 145 which are jointly trained using the training data 146 to maximize an expected value of a profit associated with at least one training transaction based on a probability of a risk control action 210 matching a corresponding target risk control action and a re-presentment control action 260 matching a corresponding target re-presentment control action taken on the at least one training transaction using the risk model 142 and the re-presentment model 145. In another aspect, for example, the joint learned model includes the risk model 142 and the route model 143 which are jointly trained using the training data 146 to maximize an expected value of a profit associated with at least one training transaction based on a probability of a risk control action 210 matching a corresponding target risk control action and a route control action 220 matching a corresponding target route control action taken on the at least one training transaction using the risk model 142 and the route model 143. Other alternative or additional embodiments corresponding to the combination of other learned models will be apparent to those skilled in the relevant arts.

In an aspect, the second learned model is used to take a second control action on the at least one training transaction after the first learned model is used to take a first control action on the at least one training transaction, and an output of the first learned model is used as an input to the second learned model. For example, in an aspect, the route model 143 is used to take a route control action 220 after the risk model 142 is used to take a risk control action 210, and the risk score output by the risk model 142 is used as input to the route model 143 to generate a route score. Other alternative or additional embodiments corresponding to the combination of other learned models will be apparent to those skilled in the relevant arts.

In an aspect, data indicating whether a previously taken control action using the first learned model or using the second learned model has matched a corresponding target control action is used as an input to the first learned model or to the second learned model. For example, in an aspect, data indicating whether a risk control action 210 using the risk model 142 has matched a target risk control action or whether a route control action 220 using the route model 143 has matched a target route control action is used as an input to the risk model 142 or to the route model 143. Other alternative or additional embodiments corresponding to the combination of other learned models will be apparent to those skilled in the relevant arts.

In an aspect, the joint learned model includes at least two learned models selected from the group consisting of a risk model 142 configured to generate a risk score, a route model 143 configured to generate a route score, a retry model 144 configured to generate a retry score, and a re-presentment model 145 configured to generate a re-presentment score. The risk score for the at least one training transaction is indicative of a probability of the at least one transaction being fraudulent. The route score for the at least one training transaction is indicative of a probability of successful settlement of the at least one transaction using a routing schedule for routing the at least one training transaction or a payment processor device 150 to process the at least one training transaction. The retry score for the at least one training transaction is indicative of a probability of successful settlement of the at least one transaction when the at least one training transaction has been declined and retried. The re-presentment score for the at least one training transaction is indicative of a probability of success in re-presenting the at least one transaction when a chargeback has been issued on the at least one training transaction.

In an aspect, the control actions taken on the at least one training transaction include at least two control actions selected from the group consisting of a risk control action 210 taken based on the risk score, a route control action 220 taken based on the route score, a retry control action 230 taken based on the retry score, and a re-presentment control action 260 taken based on the re-presentment score. The risk control action 210 indicates whether to allow the at least one training transaction to proceed. The route control action 220 indicates a routing schedule for routing the at least one training transaction or a payment processor device 150 to process the at least one training transaction. The retry control action 230 indicates whether to retry the at least one training transaction if the at least one training transaction is declined. The re-presentment control action 280 indicates whether to comply with a chargeback request associated with the at least one training transaction.

In an aspect, the risk score is provided as an input to at least one of the route model 143, the retry model 144, or the re-presentment model 145. In an aspect, the route score is provided as an input to at least one of the retry model 143 or the re-presentment model 145. In an aspect, the retry score is provided as an input to the re-presentment model 145.

In an aspect, at least one of the risk model 142, the route model 143, the retry model 144, or the re-presentment model 145 is a real-time or near-real-time machine learning model.

In an aspect, at least one of the risk model 142, the route model 143, the retry model 144, or the re-presentment model 145 is a supervised or semi-supervised machine learning model.

In an aspect, the re-presentment model 145 further generates a re-presentment explanation configured to be provided as evidence for re-presenting the at least one training transaction. In an aspect, the re-presentment explanation is a human-understandable explanation.

Thus, the described apparatus and methods introduce a novel way for merchant payment processing.

While examples of apparatuses and methods for processing credit card payments have been provided, the present application is not limited to such examples. It will be apparent to those skilled in the art that the above disclosed processes/flowcharts may also be used for processing payments made with other payment instruments/methods.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

Figure 11:
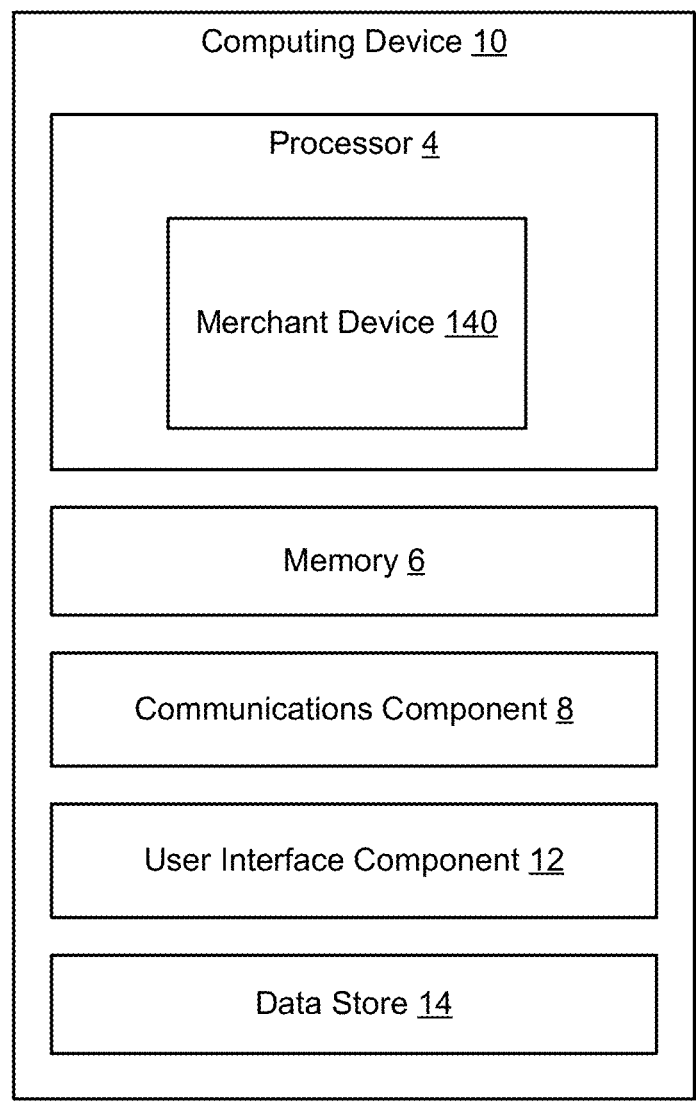
FIG. 11 is a block diagram of an example computer system on which the disclosed systems and methods can be implemented, according to aspects of the present disclosure.

FIG. 11 illustrates an example computing device 10 including additional optional component details as those shown in FIG. 1. In an example, the computing device 10 may include a processor 4 for carrying out processing functions associated with one or more of components and functions described herein. The processor 4 may include a single or multiple set of processors or multi-core processors. Moreover, the processor 4 may be implemented as an integrated processing system and/or a distributed processing system. In an aspect, for example, the processor 4 may perform the function of the merchant device 140 as described above. In other examples, the processor 4 may perform the function of any other component described above, for example the web browser on the computer terminal 120, the merchant control action prediction service 141, the risk model 142, the route model 143, the retry model 144, the re-presentment model 145, the payment processor device 150, the issuing bank device 170, the merchant bank device 190, and/or any of the bank institutes 190, as described above.

The computing device 10 may further include memory 6, such as for storing local versions of applications being executed by the processor 4, related instructions, parameters, etc. The memory 6 may include a type of memory usable by a computer, such as random access memory (RAM), read only memory (ROM), tapes, magnetic discs, optical discs, volatile memory, non-volatile memory, and any combination thereof. Additionally, the processor 4 and the memory 6 may include and execute an operating system executing on the processor 4, one or more applications, display drivers, etc., as described herein, and/or other components of the computing device 10.

Further, the computing device 10 may include a communications component 8 that provides for establishing and maintaining communications with one or more other devices, parties, entities, etc. utilizing hardware, software, and services as described herein. The communications component 8 may carry communications between components on the computing device 10, as well as between the computing device 10 and external devices, such as devices located across a communications network and/or devices serially or locally connected to the computing device 10. For example, the communications component 8 may include one or more buses, and may further include transmit chain components and receive chain components associated with a wireless or wired transmitter and receiver, respectively, operable for interfacing with external devices.

Additionally, the computing device 10 may include a data store 102, which can be any suitable combination of hardware and/or software, that provides for mass storage of information, databases, and programs employed in connection with examples described herein. For example, a data store 14 may be or may include a data repository for applications and/or related parameters not currently being executed by processor 4. In addition, the data store 14 may be a data repository for an operating system, application, display driver, etc., executing on the processor 4, and/or one or more other components of the computing device 10.

The computing device 10 may also include a user interface component 12 operable to receive inputs from a user of the computing device 10 and further operable to generate outputs for presentation to the user (e.g., via a display interface to a display device). The user interface component 12 may include one or more input devices, including but not limited to a keyboard, a number pad, a mouse, a touch-sensitive display, a navigation key, a function key, a microphone, a voice recognition component, or any other mechanism capable of receiving an input from a user, or any combination thereof. Further, the user interface component 12 may include one or more output devices, including but not limited to a display interface, a speaker, a haptic feedback mechanism, a printer, any other mechanism capable of presenting an output to a user, or any combination thereof.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more examples, one or more of the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method, in a data processing system comprising a processor and a memory, the memory comprising instructions executed by the processor to process transactions using a joint learned model including a risk model, a route model, a retry model, and a re-presentment model, the method comprising:
   receiving a training transaction;
   jointly training the joint learned model to improve an expected profit that is based on a probability of a plurality of control actions matching corresponding target control actions taken on the training transaction using the joint learned model, the jointly training comprising:
      executing, based on a risk score generated by the risk model, a risk control action to determine whether or not to initiate processing of the training transaction;
      executing, based on the risk score and a route score generated by the route model, a route control action that indicates a payment processor to process the training transaction if initiated;
      executing, based on the risk score, the route score, and a retry score generated by the retry model, a retry control action that indicates whether or not to retry the training transaction if declined; and
      executing, based on the risk score, the route score, the retry score, and a re-presentment score generated by the re-presentment model, a re-presentment control action that indicates whether or not to re-present the training transaction if a chargeback is initiated;
   receiving a current transaction; and
   processing the current transaction by taking at least one control action using the joint learned model that is trained using at least the training transaction.

2. The method of claim 1, wherein processing the current transaction comprises using a second learned model within the joint learned model to take a second control action on the current transaction after using a first learned model within the joint learned model to take a first control action on the current transaction, wherein an output of the first learned model is used as an input to the second learned model.

3. The method of claim 2, wherein data indicating whether a previously taken control action using the first learned model or using the second learned model has matched a corresponding target control action is used as an input to the first learned model or to the second learned model.

4. The method of claim 1, wherein the risk score for the training transaction is indicative of a probability of the training transaction being fraudulent.

5. The method of claim 1, wherein the route score for the training transaction is indicative of a probability of successful settlement of the training transaction using a routing schedule for routing the training transaction or the payment processor to process the training transaction.

6. The method of claim 1, wherein the retry score for the training transaction is indicative of a probability of successful settlement of the training transaction when the training transaction has been declined and retried.

7. The method of claim 1, wherein the re-presentment score for the training transaction is indicative of a probability of success in re-presenting the training transaction when the chargeback has been issued on the training transaction.

8. The method of claim 1, wherein processing the current transaction comprises providing an output of the risk model as an input to at least one of the route model, the retry model, or the re-presentment model.

9. The method of claim 1, wherein processing the current transaction comprises providing an output of the route model as an input to at least one of the retry model or the re-presentment model.

10. The method of claim 1, wherein processing the current transaction comprises providing an output of the retry model as an input to the re-presentment model.

11. The method of claim 1, wherein at least one of the risk model, the route model, the retry model, or the re-presentment model is a real-time or near-real-time machine learning model.

12. The method of claim 1, wherein at least one of the risk model, the route model, the retry model, or the re-presentment model is a supervised or semi-supervised machine learning model.

13. The method of claim 1, wherein the re-presentment model further generates a re-presentment explanation configured to be provided as evidence for re-presenting the training transaction.

14. The method of claim 13, wherein the re-presentment explanation is a human-understandable explanation.

15. A transaction processing apparatus, comprising:
a memory; and
a processor coupled to the memory, wherein the processor is configured to process transactions using a joint learned model including a risk model, a route model, a retry model, and a re-presentment model by:
  receiving a training transaction;
  jointly training the joint learned model to improve an expected profit that is based on a probability of a plurality of control actions matching corresponding target control actions taken on the training transaction using the joint learned model, the jointly training comprising:
    executing, based on a risk score generated by the risk model, a risk control action to determine whether or not to initiate processing of the training transaction;
    executing, based on the risk score and a route score generated by the route model, a route control action that indicates a payment processor to process the training transaction if initiated;
    executing, based on the risk score, the route score, and a retry score generated by the retry model, a retry control action that indicates whether or not to retry the training transaction if declined; and
    executing, based on the risk score, the route score, the retry score, and a re-presentment score generated by the re-presentment model, a re-presentment control action that indicates whether or not to re-present the training transaction if a chargeback is initiated;
  receiving a current transaction; and
  processing the current transaction by taking at least one control action using the joint learned model that is trained using at least the training transaction.

16. A transaction processing system, comprising:
a memory; and
at least one processor coupled to the memory and configured to:
  receive a current transaction; and
  process the current transaction by taking at least one control action using a joint learned model that includes a risk model, a route model, a retry model, and a re-presentment model, wherein the joint learned model is trained using at least a training transaction by:
    receiving the training transaction; and
    jointly training the joint learned model to improve an expected profit that is based on a probability of a plurality of control actions matching corresponding target control actions taken on the training transaction using the joint learned model, the jointly training comprising:
      executing, based on a risk score generated by the risk model, a risk control action to determine whether or not to initiate processing of the training transaction;
      executing, based on the risk score and a route score generated by the route model, a route control action that indicates a payment processor to process the training transaction if initiated;
      executing, based on the risk score, the route score, and a retry score generated by the retry model, a retry control action that indicates whether or not to retry the training transaction if declined; and
      executing, based on the risk score, the route score, the retry score, and a re-presentment score generated by the re-presentment model, a re-presentment control action that indicates whether or not to re-present the training transaction if a chargeback is initiated.

17. The transaction processing system of claim 16, wherein the at least one processor is configured to process the current transaction by using a second learned model within the joint learned model to take a second control action on the current transaction after using a first learned model within the joint learned model to take a first control action on the current transaction, wherein an output of the first learned model is used as an input to the second learned model.

18. The transaction processing system of claim 17, wherein data indicating whether a previously taken control action using the first learned model or using the second learned model has matched a corresponding target control action is used as an input to the first learned model or to the second learned model.

19. The transaction processing system of claim 16, wherein the risk score for the training transaction is indicative of a probability of the training transaction being fraudulent, wherein the route score for the training transaction is indicative of a probability of successful settlement of the training transaction using a routing schedule for routing the training transaction or using the payment processor to process the training transaction, wherein the retry score for the training transaction is indicative of a probability of successful settlement of the training transaction when the training transaction has been declined and retried, wherein the re-presentment score for the training transaction is indicative of a probability of success in re-presenting the training transaction when the chargeback has been issued on the training transaction.

20. The transaction processing system of claim 16, wherein the at least one processor is configured to process the current transaction by providing an output of the risk model as an input to at least one of the route model, the retry model, or the re-presentment model.

* * * * *